(12) United States Patent
Nakashita

(10) Patent No.: US 8,284,464 B2
(45) Date of Patent: Oct. 9, 2012

(54) IMAGE PROCESSING METHOD AND APPARATUS TO SCAN ON BOTH SIDES OF A DOCUMENT

(75) Inventor: Tsunahito Nakashita, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 688 days.

(21) Appl. No.: 12/021,882

(22) Filed: Jan. 29, 2008

(65) Prior Publication Data

US 2008/0180765 A1   Jul. 31, 2008

(30) Foreign Application Priority Data

Jan. 31, 2007   (JP) .................................. 2007-022241

(51) Int. Cl.
*H04N 1/04* (2006.01)
(52) U.S. Cl. .... 358/498; 358/448; 358/408; 358/426.03
(58) Field of Classification Search ............. 358/426.03; 710/52–57; 713/600
See application file for complete search history.

(56) References Cited

U.S. PATENT DOCUMENTS

| | | | | |
|---|---|---|---|---|
| 4,729,020 A * | 3/1988 | Schaphorst et al. | ..... | 375/240.05 |
| 5,206,730 A * | 4/1993 | Sakai | ......................... | 348/220.1 |
| 5,751,438 A * | 5/1998 | Murai et al. | ................... | 358/403 |
| 5,771,108 A * | 6/1998 | Ikeda et al. | ................... | 358/500 |
| 6,122,077 A * | 9/2000 | Kaji | ............................... | 358/448 |
| 6,397,343 B1 * | 5/2002 | Williams et al. | ............. | 713/501 |
| 7,460,257 B2 * | 12/2008 | Lee | .............................. | 358/1.15 |
| 7,711,966 B2 * | 5/2010 | Prabhakaran et al. | ........ | 713/300 |
| 7,742,201 B2 * | 6/2010 | Murata | ........................ | 358/474 |
| 2001/0022671 A1 * | 9/2001 | Itoh | ............................... | 358/448 |
| 2003/0107779 A1 * | 6/2003 | Chen et al. | ..................... | 358/486 |
| 2005/0219188 A1 * | 10/2005 | Kawabe et al. | ................. | 345/94 |
| 2006/0047987 A1 * | 3/2006 | Prabhakaran et al. | ........ | 713/322 |
| 2006/0103896 A1 * | 5/2006 | Chen | ............................ | 358/474 |

(Continued)

FOREIGN PATENT DOCUMENTS

JP   62-171261   7/1987

(Continued)

OTHER PUBLICATIONS

Oct. 3, 2011 Japanese Office Action, which is enclosed without an English Translation, that issued in Japanese Patent Application No. 2007-022241.

*Primary Examiner* — Twyler Haskins
*Assistant Examiner* — Christopher D Wait
(74) *Attorney, Agent, or Firm* — Cowan, Liebowitz & Latman, P.C.

(57) ABSTRACT

The image processing apparatus includes a plurality of scanning units scanning on both sides of a document in parallel and an image processing unit executing image processing on image data obtained by scanning of the scanning units. The first side image data obtained by the first scanning unit scanning on a first side of the document is transferred in real-time to the image processing unit in synchronous with a synchronous signal. On the other hand, the second side image data obtained by the second scanning unit scanning on a second side of the document is stored in a memory and after the transfer of the first side image data, transferred to the image processing unit in synchronous with the synchronous signal, a cycle time of which is changed in accordance with the processing contents.

12 Claims, 18 Drawing Sheets

U.S. PATENT DOCUMENTS

| | | | |
|---|---|---|---|
| 2006/0268355 A1* | 11/2006 | Chen et al. | 358/426.03 |
| 2007/0047022 A1* | 3/2007 | Ikeda | 358/474 |
| 2007/0091383 A1* | 4/2007 | Crutchfield et al. | 358/474 |
| 2007/0242313 A1* | 10/2007 | Shiomi | 358/302 |
| 2008/0056373 A1* | 3/2008 | Newlin et al. | 375/240.23 |
| 2008/0112564 A1* | 5/2008 | Vanderstraeten | 380/243 |

FOREIGN PATENT DOCUMENTS

| | | |
|---|---|---|
| JP | 08-340421 A | 12/1996 |
| JP | 11-069044 | 3/1999 |
| JP | 2002-077596 | 3/2002 |
| JP | 2003036149 A * | 2/2003 |

* cited by examiner

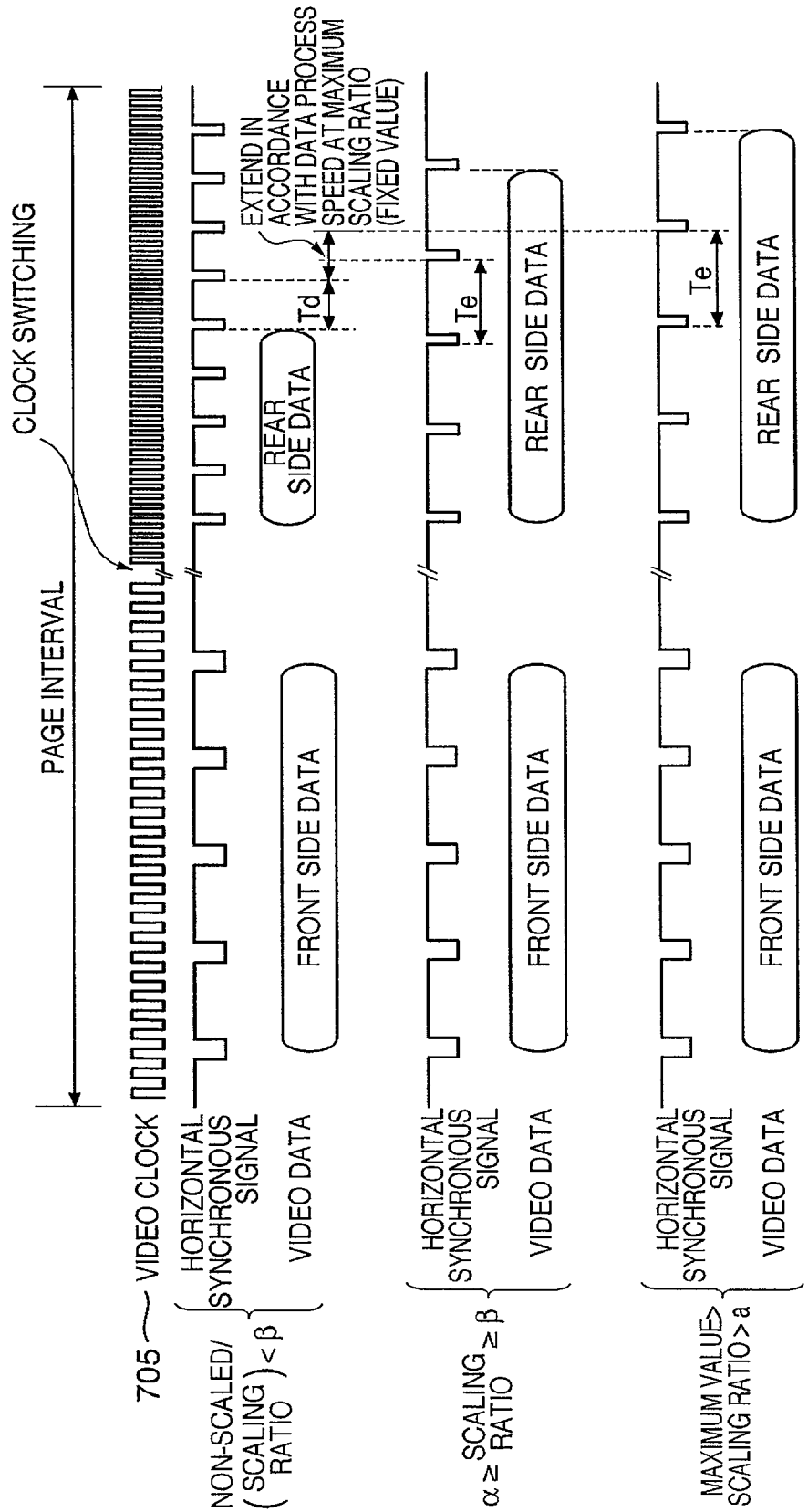

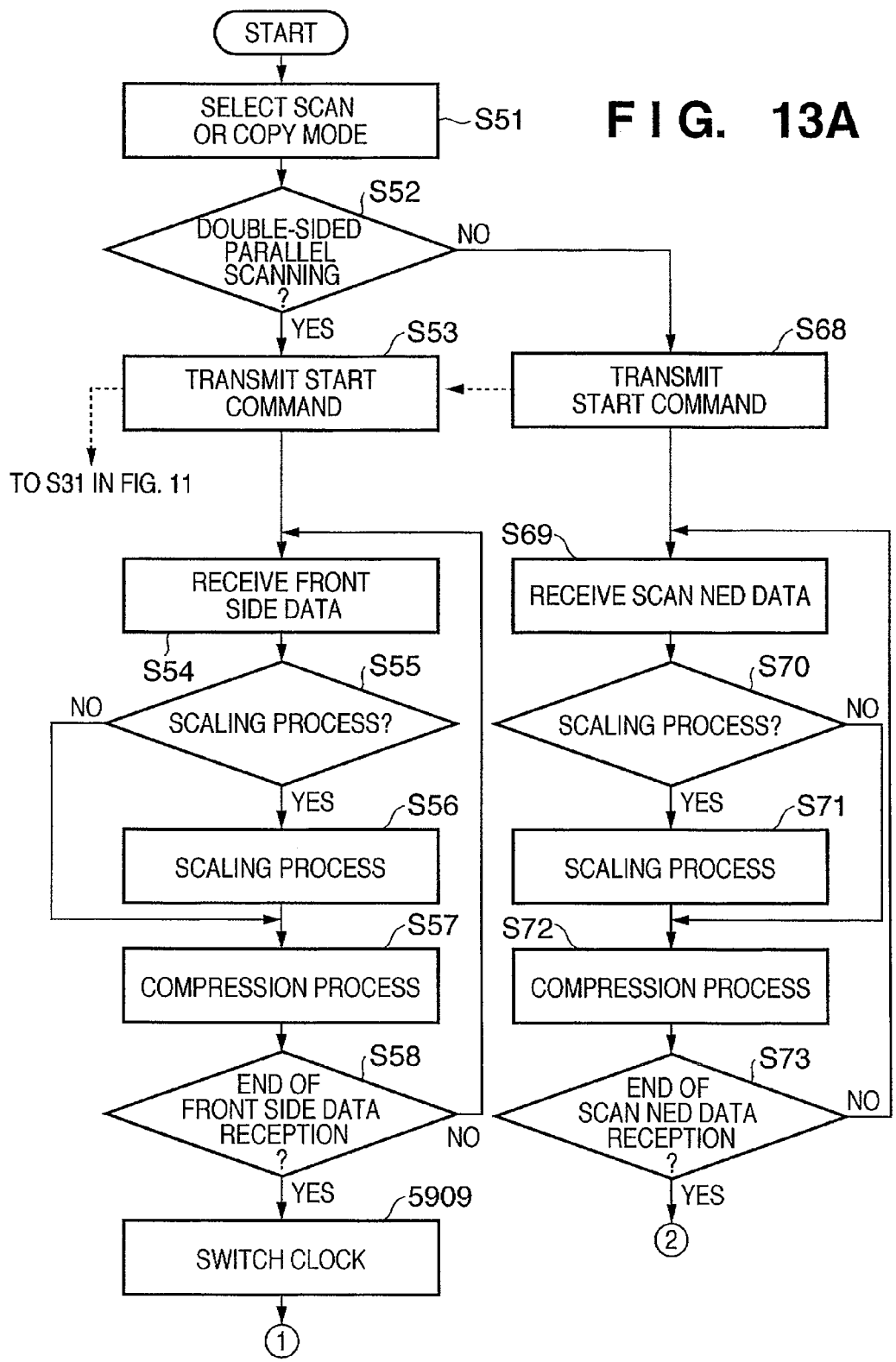

IMAGE PROCESSING METHOD AND APPARATUS TO SCAN ON BOTH SIDES OF A DOCUMENT

BACKGROUND OF THE INVENTION

1. Field of the Invention

The present invention relates to an image processing method and apparatus. For example, the present invention relates to a method of transferring image data obtained by a double-sided image scanner scanning on both sides of a double-sided document in parallel.

2. Description of the Related Art

When scanning image information of a double-sided document, a conventional image scanner with an automatic document feeder scans on the first side of the document at the scanning position, turns over the document, conveys the document to the scanning position again, and scans on the second side of the document.

However, some recent image processing apparatuses scan the image information of both sides of a document in parallel to improve the scanning productivity, suppress the jam ratio and document degradation, and reduce noise (JPA62-171261, JPA11-069044, and JPA2002-77596). In such an image scanner, a first image sensor for scanning the image information of one side of a document and a second image sensor for scanning the image information of the other side of the document are provided in the document feeding path. The second image sensor is arranged downstream (or upstream) in the document conveying direction with respect to the first image sensor.

The image scanner capable of scanning in parallel on both sides transfers image data in the following way. Scanned data of the first side is transferred in real time. Scanned data of the second side is temporarily stored in a memory, and after the transfer of the image data of the first side is ended, transferred at a higher speed by increasing a speed of the transfer clock (especially JPA62-171261).

However, the speed of the transfer clock must be more increased because the second side data transfer must be done in a short time between the end of the first side data transfer and the start of next document scanning. An image processing unit in a controller unit on the receiving side compresses the received image data by enlarging the received image under resolution conversion. In data transfer at a higher clock speed, therefore, the processing of the image processing unit is delayed depending on the set enlargement ratio, and thereby an overrun error occurs.

This problem can be solved by temporarily storing data in a memory of the controller unit and then sequentially reading out the data from the memory for image processing. However, this adds the cost of the memory and also deteriorates the performance because of the loop-back generated by intervention of the memory.

On the other hand, the above problem may also be solved by switching the transfer clock between a mode with enlargement by the image processing unit and another mode without enlargement (non-scaled processing). This adds the cost corresponding to clocks for the enlargement process in the image processing unit. If the clock speed of second side data transfer is consistent with the throughput of image processing, the performance in non-scaled processing to be normally used degrades largely.

SUMMARY OF THE INVENTION

The present invention has been made in consideration of the above conventional problems. An object of the present invention is to provide an image processing method and apparatus for, when scanning on the first and second sides of a double-sided document in parallel, preventing an overrun error at the transfer destination of second side scanned data and implementing efficient processing.

To achieve the object of the present invention, an image processing apparatus of the present invention comprises: a plurality of scanning units adapted to scan on both sides of a document in parallel, the plurality of scanning units including a first scanning unit and a second scanning unit; an image processing unit adapted to execute image processing based on image data obtained by scanning of the plurality of scanning units; a transfer unit adapted to transfer first image data obtained by the first scanning unit scanning on a first side of the document to the image processing unit in synchronous with a synchronous signal, temporarily store second image data obtained by the second scanning unit scanning on a second side of the document, and after transfer of the first image data, transfer the second image data to the image processing unit in synchronous with the synchronous signal; and a setting unit adapted to set processing contents of the image processing to be executed by the image processing unit, wherein when transferring the second image data, the transfer unit uses, as a cycle time of the synchronous signal, a cycle time changed in accordance with the processing contents set by the setting unit. When transferring the first image data, the transfer unit uses, as a cycle time of the synchronous signal, a predetermined cycle time independently of the processing contents set by the setting unit.

An image processing method of the present invention in an image processing apparatus including a plurality of scanning units adapted to scan on both sides of a document in parallel, the plurality of scanning units including a first scanning unit and a second scanning unit, and an image processing unit adapted to execute image processing based on image data obtained by scanning of the plurality of scanning units, comprises the steps of setting processing contents of the image processing to be executed by the image processing unit; executing first transfer of first image data obtained by the first scanning unit scanning on a first side of the document to the image processing unit in synchronous with a synchronous signal; temporarily storing second image data obtained by the second scanning unit scanning on a second side of the document; executing, after transfer of the first image data, second transfer of the second image data stored in the storing step to the image processing unit in synchronous with the synchronous signal, wherein in the second transfer, a cycle time changed in accordance with the processing contents set in the setting step is used as a cycle time of the synchronous signal. In the first transfer, a predetermined cycle time independently of the processing contents set in the setting step is used as a cycle time of the synchronous signal.

As described above, according to the present invention, it is possible to provide an image processing method and apparatus for, when scanning on the first and second sides of a double-sided document simultaneously, preventing an overrun error at the transfer destination of second side scan data and implementing efficient processing.

More specifically, in scanning on the first and second sides of a double-sided document in parallel, the cycle time of a horizontal synchronous signal is set to an optimum value only for the second side in accordance with the scaling ratio desired by a user and the corresponding process speed of the scaling and compression processes of the image processing unit. This makes it possible to prevent an overrun error without adding a memory to the controller unit side and implement efficient data transfer between the image processing unit and the controller unit in scaling.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a timing chart showing the concept of image data transfer according to the first example of the embodiment;

FIGS. 13A and 13B are a flowchart illustrating the process procedure on the controller unit side according to the second example of the embodiment.

DESCRIPTION OF THE EMBODIMENTS

The embodiments of an image processing apparatus of the present invention will be described below in detail with reference to the accompanying drawings. In the following embodiments, double-sided scanning will be expressed as scanning front side/scanning rear side. However, the front and rear sides are relative to each other and will generally be expressed as first side/second side in claims.

<Arrangement Example of Image Processing Apparatus of Embodiment>

Figure 1A:
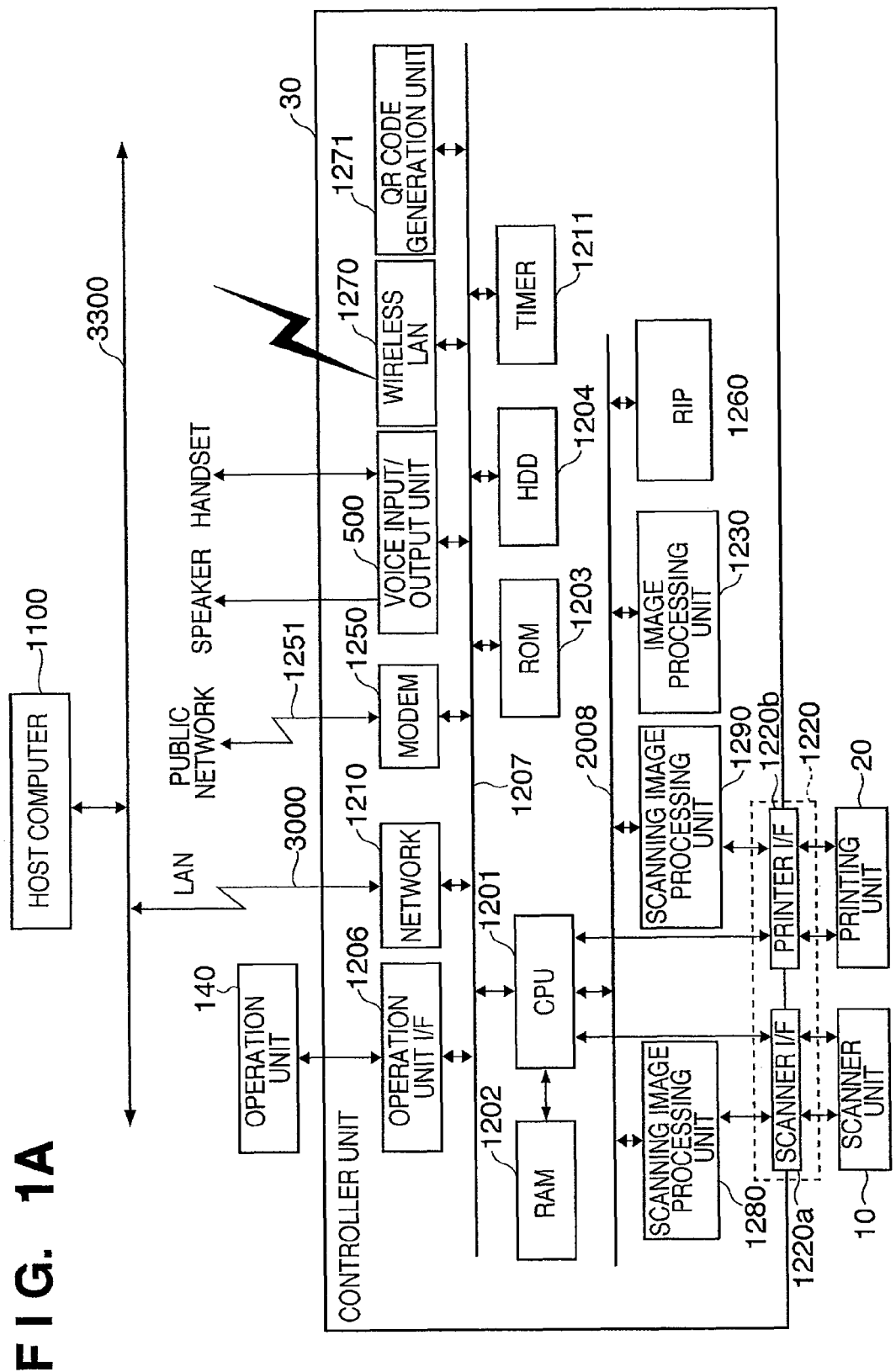
FIG. 1A is a block diagram showing an arrangement example of an image processing apparatus according to an embodiment.

FIG. 1A is a block diagram showing the arrangement of the controller unit of an image processing apparatus according to the embodiment.

A controller unit 30 is connected to a scanner unit 10 serving as an image input device and a printing unit 20 serving as an image output device. The controller unit 30 is also connected to a LAN 3000 and a public network (WAN) 1251 to input/output image information and device information.

A CPU 1201 in the controller unit 30 is a calculating and processing unit which controls the entire system. A RAM 1202 serves as a work memory for the operation of the CPU 1201 and also as an image memory for temporarily storing image data. A ROM 1203 is a boot ROM which stores the boot program of the controller unit 30. An HDD 1204 is a hard disk drive which stores a software program, image data, and software counter value. The software counter value is calculated and incremented on the basis of an arbitrary reference capacity value preset based on an image output count or the amount of data processed by the CPU 1201. The counter value need not always be stored in the HDD 1204 and may be stored in an area of, e.g., an EEPROM (not shown) if it can store and hold the value even after power off. A timer 1211 functions to set the time of the image processing apparatus and controller unit or generate an interrupt every predetermined time.

An operation unit I/F 1206 serves as an interface to an operation unit (for UI, user interface) 140 and outputs, to the operation unit 140, image data to be displayed on it. The operation unit I/F 1206 also transmits, to the CPU 1201, information input from the operation unit 140 by the user of the image processing apparatus. A network 1210 is connected to the LAN 3000 to input/output output image data or information related to device control. The network 1210 also receives output image data corresponding to an input operation on the operation unit 140 from a host computer 1100 on a network 3300 or an output image data management apparatus (not shown), and outputs the image. A modem 1250 is connected to the public network 1251 to input/output information. A voice input/output unit 500 controls to output voice to a speaker or output/input voice from/to a handset.

A wireless LAN 1270 wirelessly communicates with an external device. A QR code generation unit 1271 bitmaps a printable two-dimensional code by encoding received character string information, thereby generating a QR code.

A control bus 1207 is a high-speed bus used by the CPU 1201 to control the above devices. The devices are connected to the control bus 1207.

An image bus 2008 is a high-speed bus for image data transfer. The following devices are arranged on the image bus 2008. A raster image processor (RIP) 1260 rasterizes a PDL code into a bitmap image. An image processing unit 1230 executes synthesis, rotation, editing, filtering, resolution conversion, binarization, and color space conversion of image data.

A scanning image processing unit 1280 controls to receive image data from the scanner unit 10 via a scanner I/F. The scanning image processing unit 1280 also processes input image data by, for example, line delay correction, main/sub MTF correction, gamma correction, direct mapping, color space filtering, editing, resolution conversion (scaling), and compression. A printing image processing unit 1290 executes printer correction and resolution conversion of print output image data and controls image data output to the printing unit via a printer I/F. A device I/F unit 1220 (scanner I/F 1220a and printer I/F 1220b) connects the scanner unit 10 and printing unit 20 serving as image input and output devices to the controller unit 30 and converts the image data between the synchronous system and the asynchronous system. The CPU 1201 executes control by communicating with each of the scanner unit 10 and printing unit 20 by serial communication and exchanging commands and statuses.

(Arrangement Example of Control Portion of Controller Unit 30)

Figure 1B:
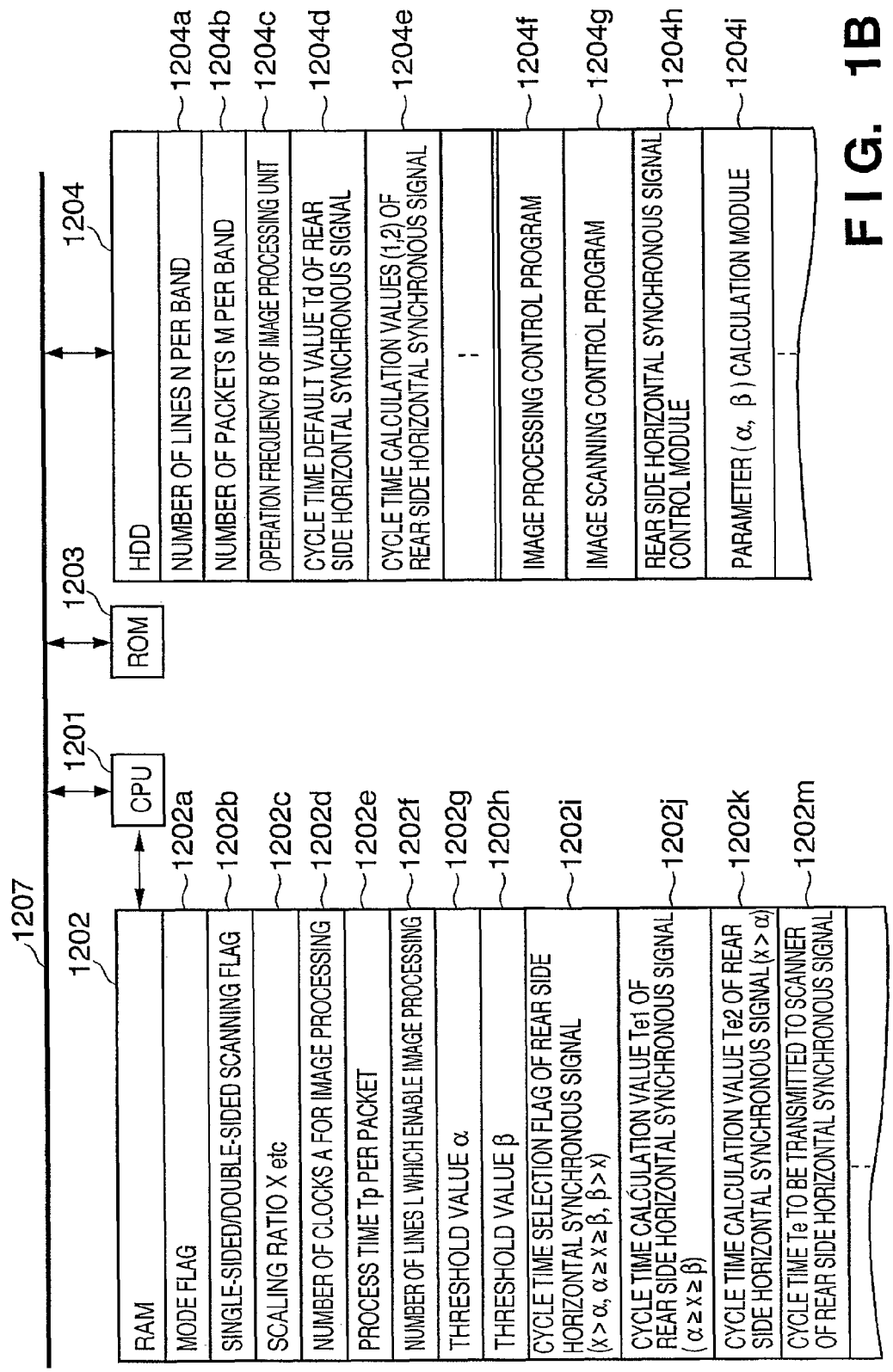
FIG. 1B is a view showing an arrangement example of the control portion of a controller unit according to the embodiment.

FIG. 1B is a view showing an arrangement example of the control portion of the controller unit 30 according to the embodiment. FIG. 1B especially shows the storage configuration of data and computer programs used in the embodiment.

Examples of storage areas ensured in the RAM 1202 in FIG. 1A for the control of the CPU 1201 will be described first.

A mode flag storage area 1202a stores a mode of the image processing apparatus which is selected from a copy mode, send mode, and box mode. An area 1202b stores a flag which indicates single- or double-sided scanning of the scanner unit (image scanner). An area 1202c stores a parameter such as a scaling ratio "X" in image processing. An area 1202d stores the number of clocks "A" for image processing of the image processing unit. An area 1202e stores a process time "Tp" calculated by the CPU 1201 and required by the image processing unit to process image data of one packet transmitted from the scanner unit. An area 1202f stores the number of transmission lines "L" which enable image processing of one band (N lines). An area 1202g stores a threshold value "α" calculated by the CPU 1201. An area 1202h stores a threshold value "β" calculated by the CPU 1201. An area 1202i stores a flag which selects, on the basis of the relationship between α and β, the cycle time of a pseudo horizontal synchronous signal to transmit rear side image data. An area 1202j stores a cycle time "Te1 ($\alpha \geq X \geq \beta$)" of the pseudo horizontal synchronous signal to transmit rear side image data, which is calculated by the CPU 1201. An area 1202k stores a cycle time "Te2 ($X > \alpha$)" of the pseudo horizontal synchronous signal to transmit rear side image data, which is calculated by the CPU 1201. An area 1202m stores a cycle time "Te" of the pseudo horizontal synchronous signal to transmit rear side image data, which is selected in correspondence with the flag 1202i and sent to the scanner unit.

Examples of parameters and programs stored in the HDD 1204 in FIG. 1A will be described next.

Reference numeral 1204a denotes the number of lines "N" contained in one band of the unit of image processing; 1204b, the number of packets "M" to transmit one band; 1204c, an operation frequency "B" of the image processing unit; 1204d, a cycle time default value "Td" of the pseudo horizontal synchronous signal to transmit rear side image data; and 1204e, expressions to calculate the cycle time of the pseudo horizontal synchronous signal to transmit rear side image data. In this example, expressions "1" and "2" are stored. The expressions used in this example can be either stored individually or embedded in a software program. The expressions of the threshold values "α" and "β" may be stored.

An image processing control program 1204f controls the overall image processing apparatus. An image scanning control program 1204g controls image scanning according to the embodiment. A rear side horizontal synchronous signal control module 1204h controls the cycle time of the pseudo horizontal synchronous signal to transmit rear side image data according to the embodiment, which is used by the image scanning control program 1204g. A parameter (α,β) calculation module 1204i calculates parameters (threshold values "α" and "β") to control the cycle time of the pseudo horizontal synchronous signal to transmit rear side image data according to the embodiment, which is used by the image scanning control program 1204g.

FIG. 1B shows only data and programs closely associated with the embodiment and does not illustrate other general-purpose and shared data and programs.

(Arrangement Example of Scanner Unit 10 and Printing Unit 20)

Figure 2:
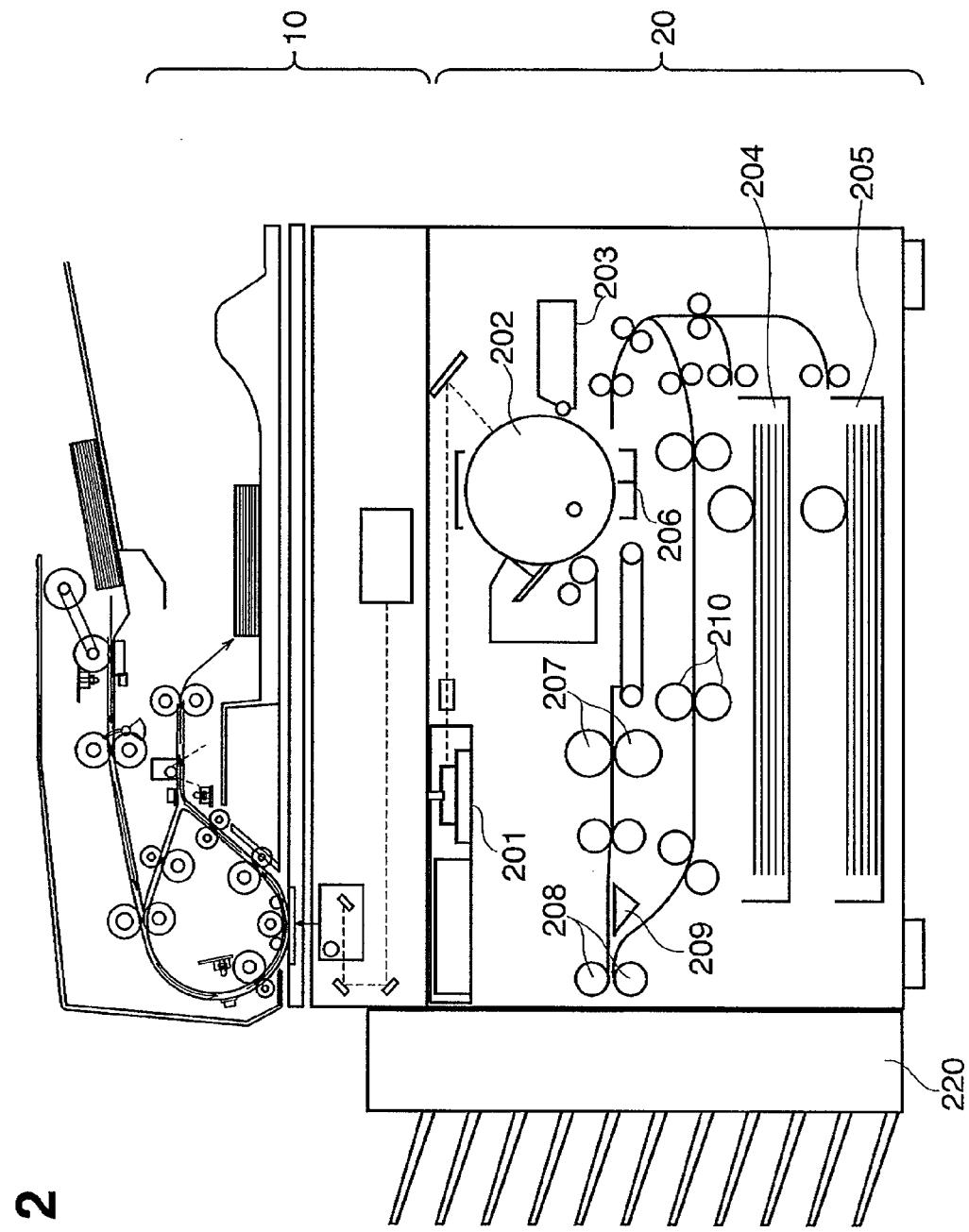
FIG. 2 is a sectional view of a scanner unit and a printing unit according to the embodiment.

FIG. 2 is a sectional view of the scanner unit 10 and printing unit 20 according to the embodiment.

An arrangement example of the document feeder capable of double-sided scanning of the scanner unit 10 of the embodiment will be described in detail with reference to FIG. 6. Image data scanned by a CCD image sensor 109 for the front side and a CIS image sensor 110 for the rear side and output are subjected to a predetermined process and then transferred to the controller unit 30 by a transfer method of the embodiment. CCD stands for Charge Coupled Device, and CIS stands for Contact Image Sensor.

A laser driver 221 of the printing unit 20 drives a laser emitting unit 201 and causes the laser emitting unit 201 to emit a laser beam corresponding to image data output from the scanner unit 10. The laser beam irradiates a photosensitive drum 202. A latent image corresponding to the laser beam is formed on the photosensitive drum 202. A developing unit 203 applies a developer to the latent image portion on the photosensitive drum 202. In synchronous with the start of laser beam irradiation, a recording paper is fed from one of cassettes 204 and 205 and conveyed to a transfer unit 206 so that the developer applied to the photosensitive drum 202 is transferred onto the recording paper.

The recording paper with the developer is conveyed to a fixing unit 207. The fixing unit 207 fixes the developer on the recording paper by heat and pressure. Discharge rollers 208 discharge the recording paper passed through the fixing unit 207. A sorter 220 sorts discharged recording papers by storing them in appropriate bins. In a double-sided print mode, after the recording paper is conveyed to the discharge rollers 208, the discharge rollers 208 are rotated in reverse directions so that the recording paper is guided to a re-feed path by a flapper 209. In a multiple printing mode, the flapper 209 guides the recording paper to the re-feed path without conveying the recording paper to the discharge rollers 208. The recording paper guided to the re-feed path is conveyed by re-feed rollers 210 and fed to the transfer unit 206 at the above-described timing.

(Arrangement Example of Control Function of Scanner Unit 10)

Figure 3A:
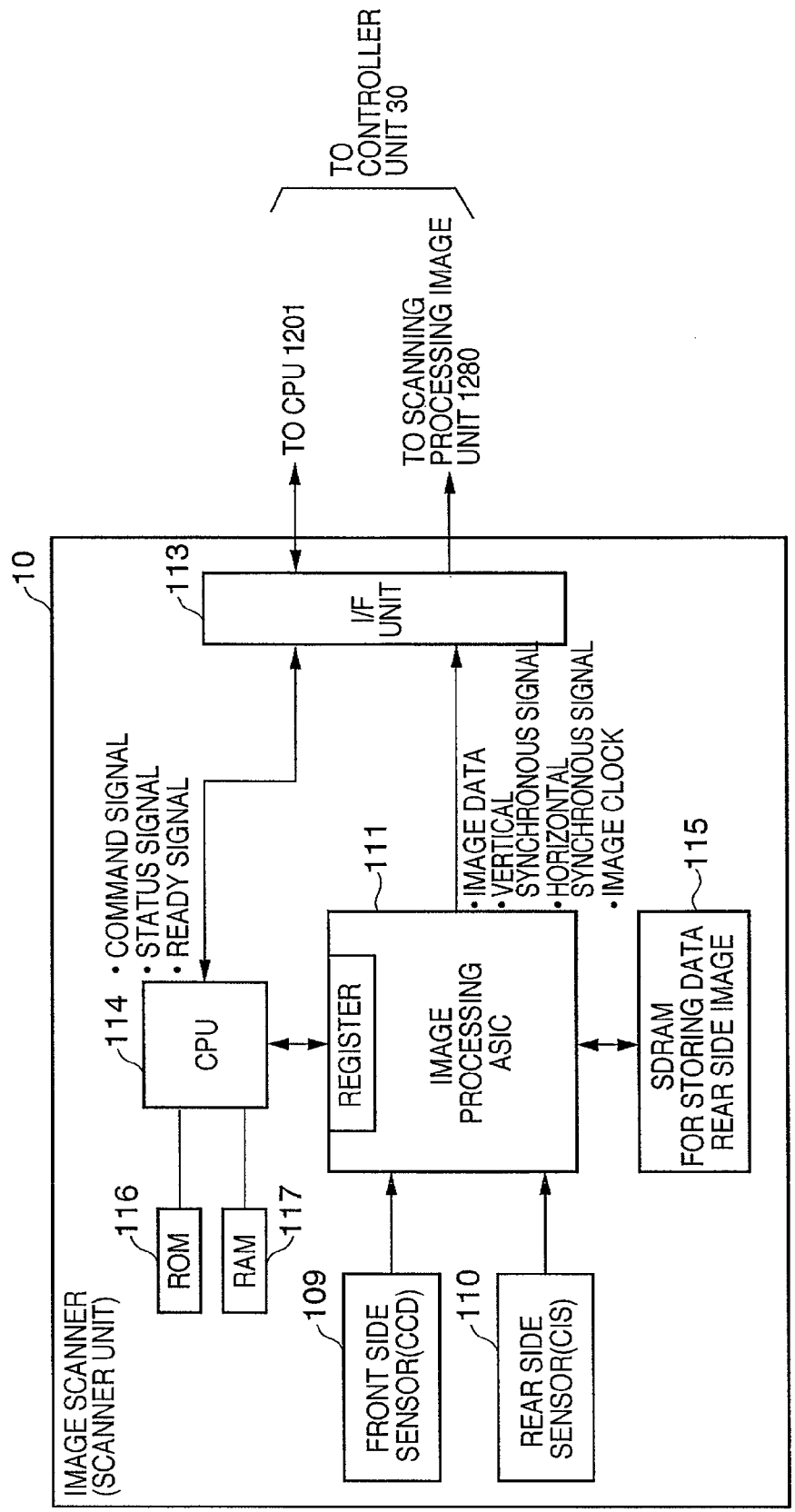
FIG. 3A is a block diagram of the scanner unit according to the embodiment.

FIG. 3A is a block diagram showing an arrangement example of the control function of the scanner unit 10.

Image data output from the CCD image sensor 109 serving as a front side sensor and the CIS image sensor 110 serving as a rear side sensor undergo analog/digital conversion by an image processing ASIC 111. Simultaneously, the image processing ASIC 111 executes shading correction and image processing. The front side image data is transferred to the controller unit 30 via an interface unit 113 in real time. The rear side image data is temporarily stored in a SDRAM for storing rear side image data 115. After the transfer of the front side data is ended, the image clock is switched to a high frequency, and the rear side image data is transferred to the controller unit 30 via the interface unit 113. A CPU 114 controls the image processing ASIC 111 and interface unit 113 in accordance with contents set by the controller unit 30. The CPU 114 executes control using a RAM 117 in accordance with a computer program stored in a ROM 116.

(Arrangement Example of Control Portion of Scanner Unit 10)

Figure 3B:
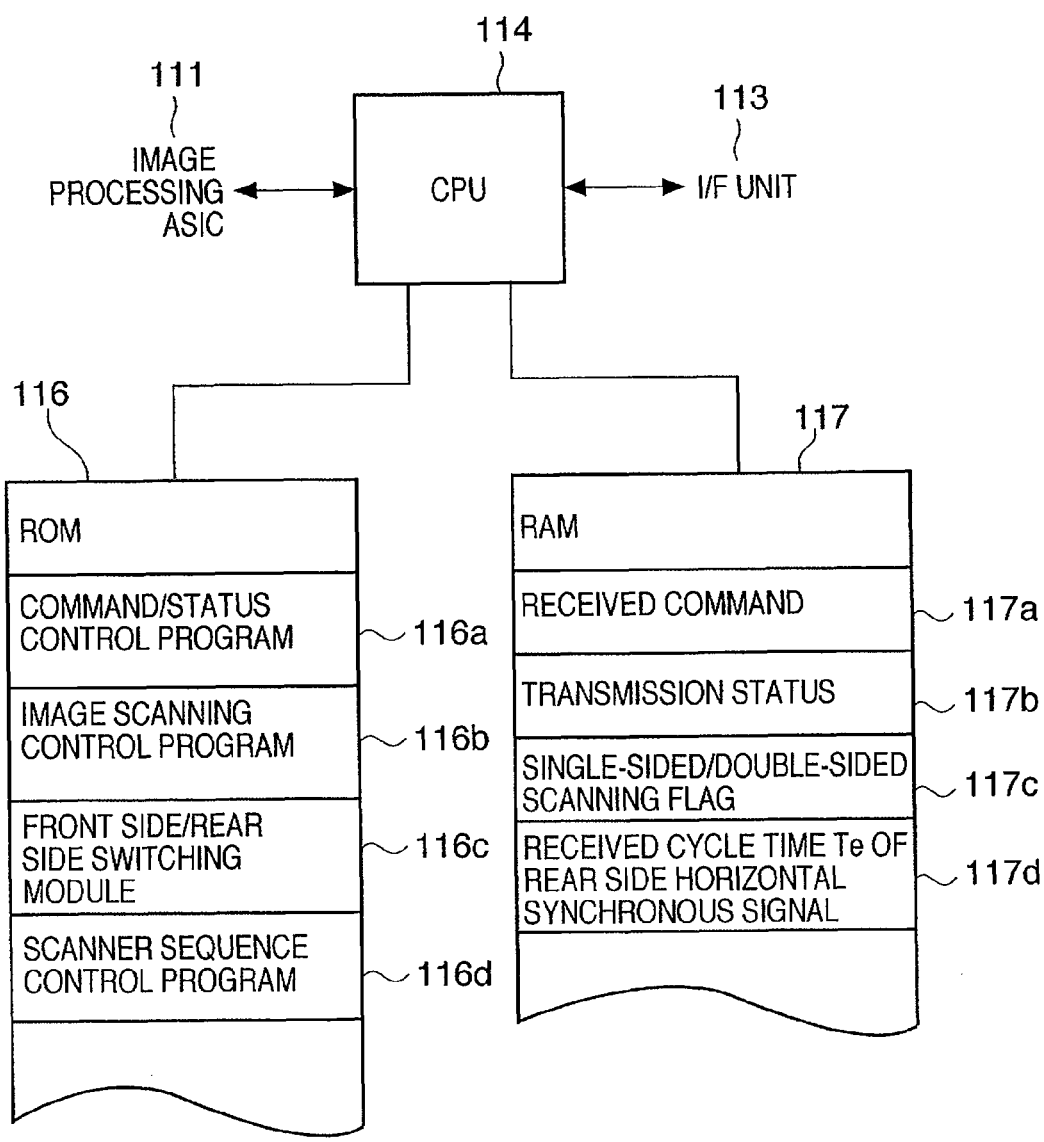
FIG. 3B is a view showing an arrangement example of the control portion of the scanner unit according to the embodiment.

FIG. 3B is a view showing an arrangement example of the control portion of the scanner unit 10. FIG. 3B especially shows programs in the ROM 116 and data stored in the RAM 117, which are used in the embodiment.

The ROM 116 stores the following programs. A command/status control program 116a controls communication with the controller unit 30. An image scanning control program 116b controls the scanner unit (image scanner) 10. A front side/rear side switching module 116c switches front side/rear side image scanning of the embodiment and is used in the image scanning control program 116b. A scanner sequence control program 116d controls the operation sequence of the hardware of the scanner unit (image scanner) 10.

The following areas are allocated in the RAM 117. An area 117a stores a command received from the controller unit 30. An area 117b stores a status to be transmitted to the controller unit 30. An area 117c stores a flag which indicates single- or double-sided scanning. An area 117d stores the cycle time "Te" of the pseudo horizontal synchronous signal to transmit rear side image data, which is received from the controller unit 30. In this embodiment, transmission of rear side image data is controlled on the basis of the cycle time "Te" of the pseudo horizontal synchronous signal.

(Schematic View and Operation Example of Operation Unit 140)

Figure 4:
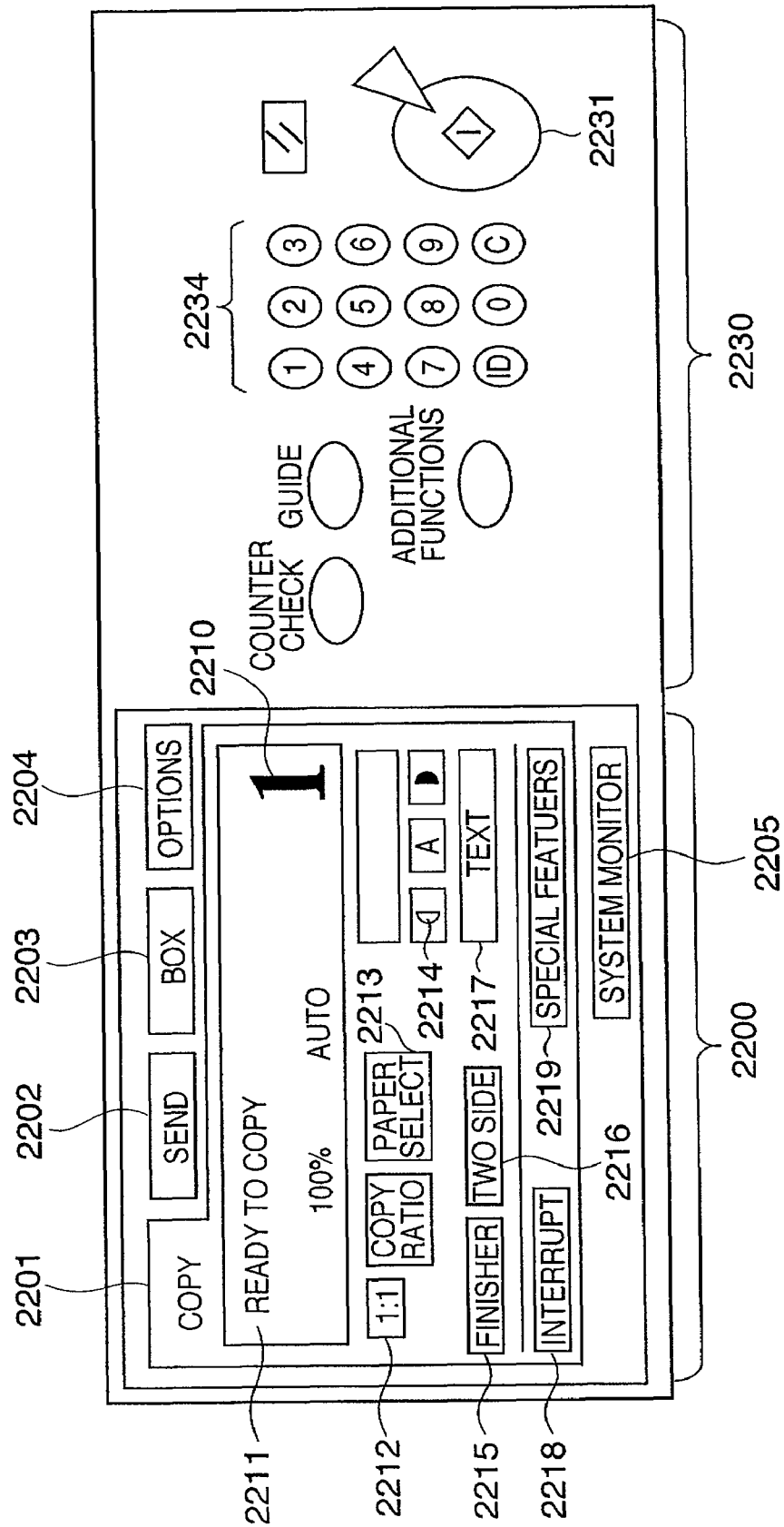
FIG. 4 is a schematic view of an operation unit according to the embodiment.

FIG. 4 is a schematic view of the operation unit 140 according to the embodiment.

The operation unit includes an LCD (Liquid Crystal Display) portion 2200 and a button operation unit 2230. The button operation unit 2230 has no direct relevance to the operation of the embodiment except a start button 2231, and a detailed description thereof will be omitted.

Referring to FIG. 4, a copy tab 2201 is a tab button to display an operation window for a copy operation. A send tab 2202 is a tab button to display an operation window for instructing a send operation such as fax or e-mail send. A box tab 2203 is a tab button to display an operation window for inputting/outputting a job to/from a box (storage unit for storing a job for each user). An options tab 2204 is a tab button to display an operation window for setting optional functions such as scanner settings. A system status monitor button 2205 displays the state or status of the MFP. When the user selects one of the buttons 2201 to 2205, the window of a corresponding operation mode is displayed.

FIG. 4 shows an example of the operation window displayed when the user selects the copy tab 2201. A copy ratio setting button 2212 in the operation window displays a window for setting a scaling ratio for direct copy, enlargement, or reduction. A post-processing setting button 2215 displays a window for setting ON/OFF and the number and the positions of, for example, stapling or punching. A double-sided setting button 2216 displays a window for selecting single-sided or double-sided printing. A paper size setting button 2213 displays a window for selecting a feed stage, paper size, and medium type. An image mode setting button 2217 selects an image mode suitable for a document image from a text mode, photo mode, and the like. A density setting button 2214 adjusts, i.e., increases or decreases the density of an output image.

A status display portion 2211 simply displays a status such as "standby", "warm-up", "jam", or "error". A count display portion 2210 displays the number of copies designated by the ten-key buttons of the button operation unit 2230, or during the operation, which page is being printed currently. An interrupt button 2218 is used to generate an interrupt to process another job during the copy operation. An application mode button 2219 displays a window for executing various image processing and layout settings such as page consecutive scanning, cover/inserting paper setting, reduction layout, and image movement. As described above, the controller unit 30 controls to receive the print process conditions of a job to be processed from the user via the display portion 2200.

Each button functions as a button capable of instruction input.

Figure 5:
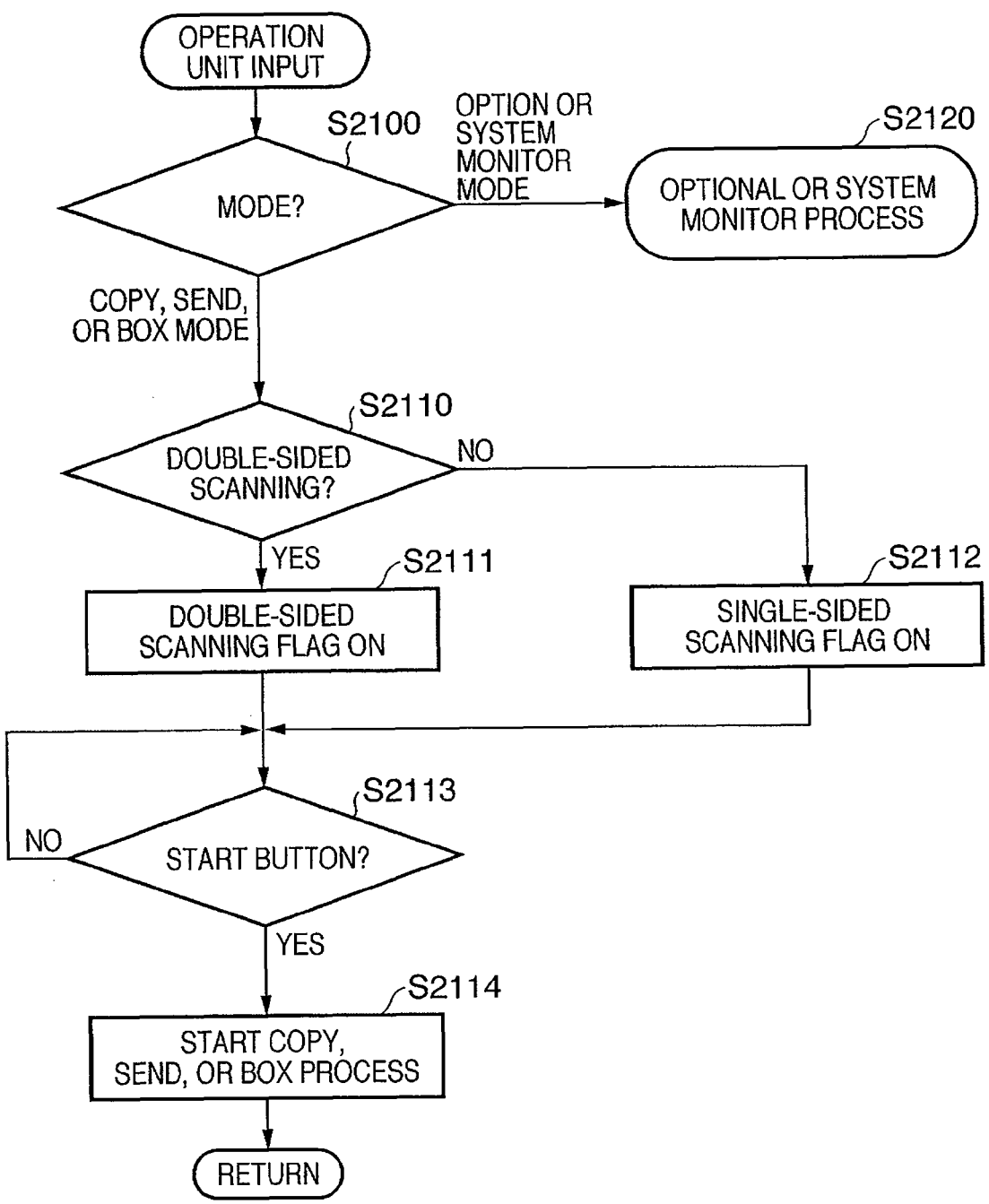
FIG. 5 is a flowchart illustrating a process procedure example of the operation unit according to the embodiment.

FIG. 5 is a flowchart illustrating a process procedure example of the operation unit 140 according to the embodiment.

In step S2100, the mode is determined. The mode changes when the user presses one of the mode selection buttons 2201 to 2205 of the LCD portion 2200 in FIG. 4. If the mode is an option or system monitor mode, a corresponding process is executed in step S2120. The optional and system monitor processes have no close relevance to the embodiment, and a detailed description thereof will be omitted.

If a copy, send, or box mode is selected, the process advances to step S2110 to determine the scanning mode of the scanner unit 10, double-sided scanning or single-sided scanning. For double-sided scanning, the process advances to step S2111 to turn on the double-sided flag (1202b in FIG. 1B). For single-sided scanning, the process advances to step S2112 to turn on the single-sided flag (or turn off the double-sided flag) (1202b in FIG. 1B).

In step S2113, the process waits unit the user presses the start button 2231. When the start button 2231 is pressed, the copy, send, or box process starts in step S2214. The controller unit 30 receives the instruction and controls the succeeding process.

In this way, a composite process including document image scanning, image printing, image transmission/reception, image storing, and data input/output to/from a computer, and the like can be done under the control of the controller unit 30.

(Arrangement Example of Document Feeder 101 of Scanner Unit 10)

Figure 6:
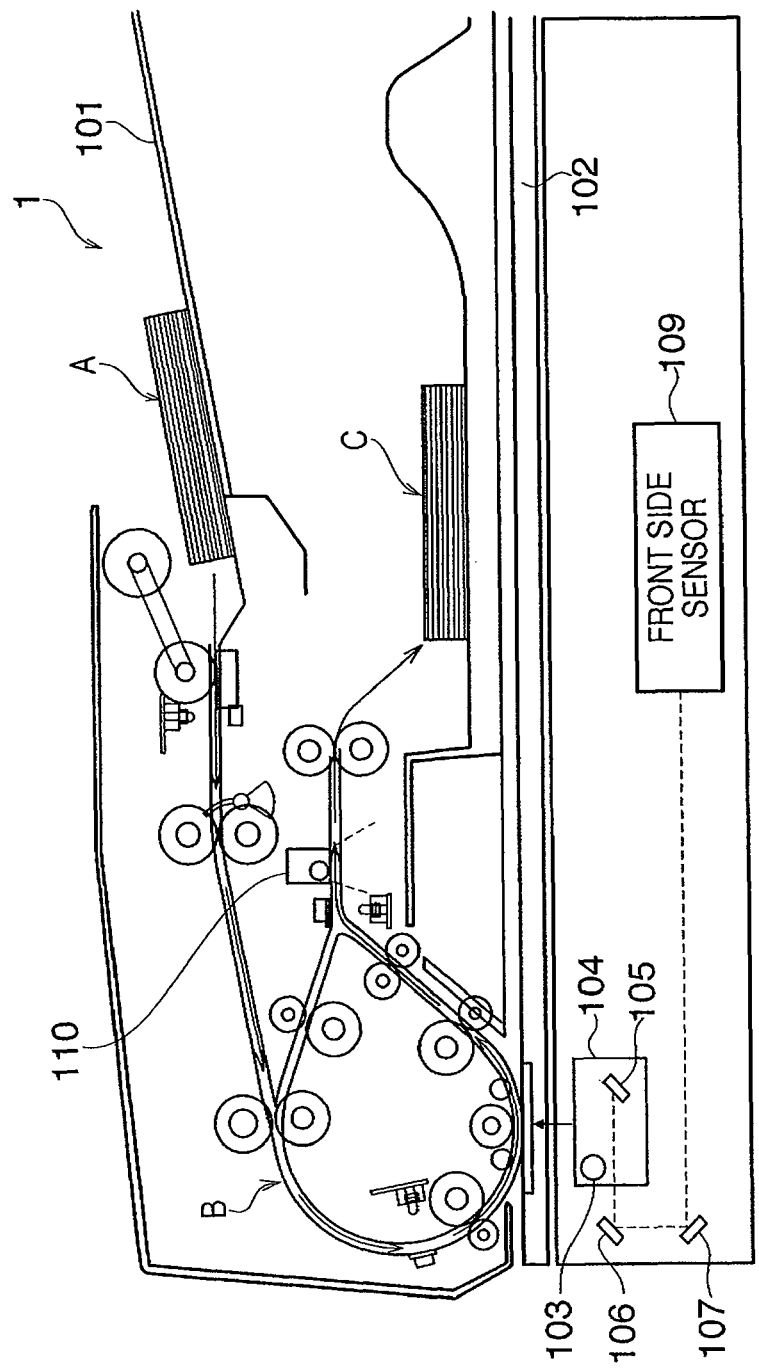
FIG. 6 is a sectional view of a double-sided image scanner unit according to the embodiment.

FIG. 6 shows an arrangement example of the double-sided scanner unit (image scanner) 10 according to the embodiment.

The automatic document feeder 101 of the scanner unit 10 feeds document sheets A before scanning onto a conveyance path B one by one sequentially from the top, and after the end of document scanning, discharges document sheets C after scanning onto a stacker. When a document sheet passes on a platen glass 102, a lamp 103 is turned on. A fixed scanner unit 104 exposes and scans the document. Light reflected by the document at this time is guided to the CCD image sensor 109 serving as a front side sensor by mirrors 105, 106, and 107 and a lens (not shown). In this way, the CCD image sensor 109 scans the front side image of the scanned document. Image data output from the CCD image sensor 109 is subjected to a predetermined process and then transferred to the printing unit 20 and controller unit 30.

Next, the document is guided to the CIS image sensor 110 serving as a rear side sensor. Image data output from the rear side sensor 110 is temporarily stored in a memory, and after the transfer of the front side image data, transferred to the printing unit 20 and controller unit 30.

An arrangement example of the suitable image processing apparatus of the embodiment has been described above.

<Operation Example of Image Processing Apparatus of Embodiment>

The image processing apparatus comprises an image scanner which scans the images of the front and rear sides of a document conveyed by an automatic document feeder which feeds document sheets stacked on a document tray one by one, and an image processing unit which processes the image scanned by the image scanner. The image scanner transfers the scan image data to the image processing unit by using a horizontal synchronous signal. The image scanner scans on the front and rear sides of a double-sided document in parallel. In transferring the scan image data of the front and rear sides to the image processing unit sequentially, the cycle time of the horizontal synchronous signal is set to an optimum value only for the rear side in accordance with the scaling ratio desired by the user and the corresponding process speed of the scaling and compression processes of the image processing unit.

(Concept of Operations of Scanner Unit 10 and Controller Unit 30)

Figure 7:
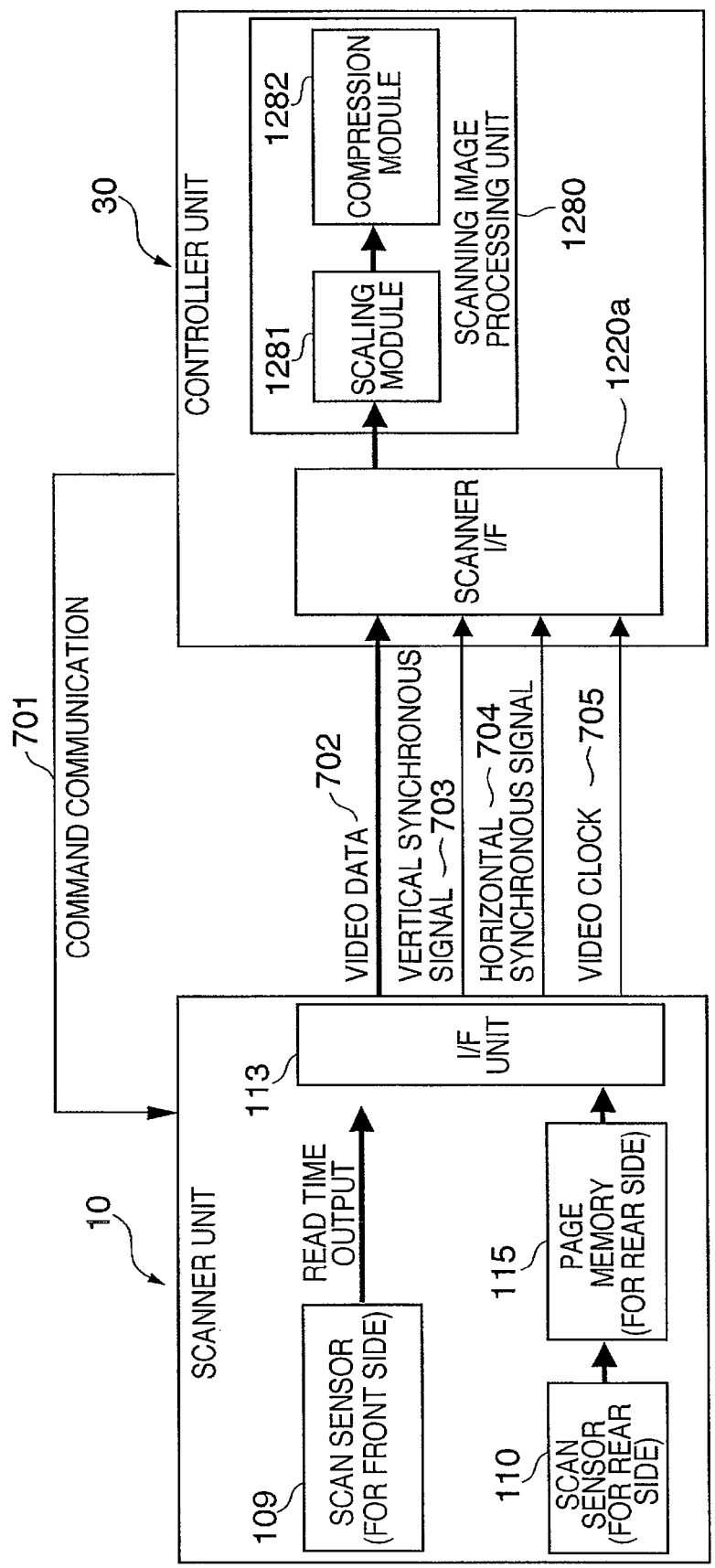
FIG. 7 is a block diagram showing an arrangement related to image data transfer between the image scanner unit and the controller unit according to the embodiment.

FIG. 7 shows a system configuration based on the concept of the operations of the scanner unit 10 and controller unit 30 according to the embodiment.

In FIG. 7, the arrangement of the scanner unit (image scanner) 10 in FIG. 3B is simplified, and a description thereof will be omitted.

FIG. 7 illustrates only parts of the controller unit 30 related to image data reception from the scanner unit (image scanner) 10. The scanner I/F 1220a receives image data from the I/F unit 113 of the scanner unit (image scanner) 10. The scanning image processing unit 1280 includes, for example, a scaling module 1281 and a compression module 1282.

The scanner unit 10 transfers image data to the scanner image processing unit 1280 of the controller unit 30 as video data 702 by a video clock 705 in synchronous with a vertical synchronous signal 703 and a horizontal synchronous signal 704. In this case, a front side scanned image data is transferred from the front side sensor 109 to the controller unit 30 in real time by the normal video clock 705 in synchronous with the vertical synchronous signal 703 and horizontal synchronous signal 704 generated by the scanner unit 10. On the other hand, a rear side scanned image data from the rear side sensor 110 is temporarily stored in the page memory (SDRAM) 115. After transfer of the front side scanned image data, the rear side scanned image data is transferred to the controller unit 30 by a faster video clock 705 in synchronous with the vertical synchronous signal 703 generated by the scanner unit 10 and the horizontal synchronous signal 704 which has been calculated by the controller unit 30 and sent to the scanner unit 10 by command communication 701.

(Concept of Image Scanning and Transfer)

Figure 8:
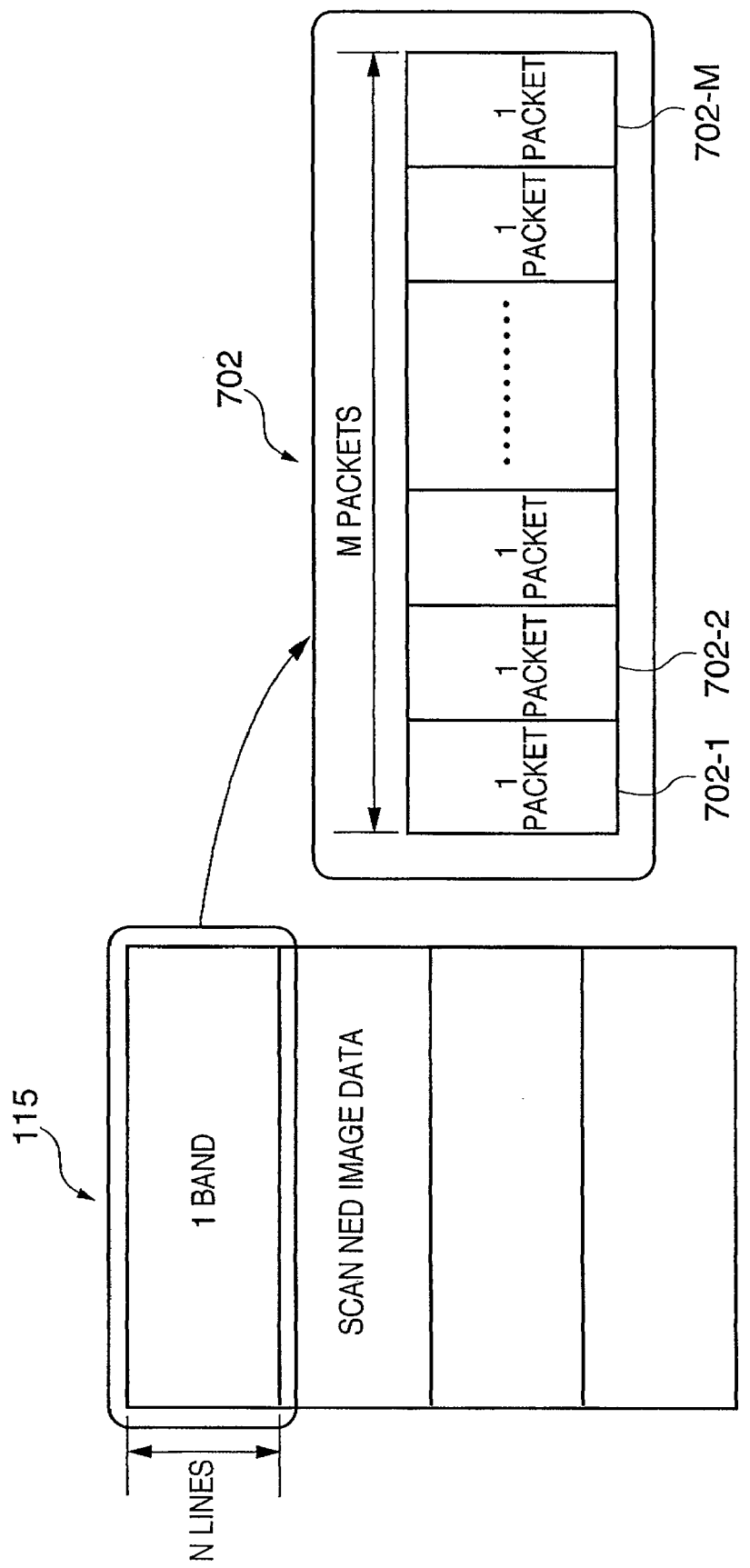
FIG. 8 is a view showing process units of image processing and image transfer according to the embodiment.

FIG. 8 is a conceptual view of image scanning and transfer according to the embodiment.

Rear side scanned image data temporarily stored in the page memory (SDRAM) 115 in FIG. 7 is processed for each band containing N lines. The video data 702 of one band including N lines is divided into M packets 720-1 to 720-M and transmitted from the scanner unit 10 to the scanner image processing unit 1280 of the controller unit 30.

(First Setting Example of Cycle Time of Rear Side Horizontal Synchronous Signal)

The first setting example of the cycle time of the rear side horizontal synchronous signal will be described below.

Let $\alpha$ be the first threshold value preset for the scaling ratio, Td be the cycle time default value of the rear side horizontal synchronous signal, and Te be the cycle time extended for the scaling process. The scanner image processing unit 1280 has a line memory. An input image is processed for each band including N lines. One band is divided into a plurality of packets so that the process is performed for each packet. One band includes M packets (FIG. 8). Let A be the number of clocks necessary for scaling and compression of one packet by the scanner image processing unit 1280, and B be the operation frequency of the scanner image processing unit 1280. The process time Tp of one packet is given by $Tp=1/B \times A$.

Hence, the number of transmission lines L to be transmitted by the default value Td of the horizontal synchronous signal, which is necessary for ensuring a time to enable scaling and compression of one band (N lines), is given by $L=(Tp \times 1.1 \times M)/Td$. The threshold value $\alpha$ is calculated by $\alpha=(2N/L) \times 100$ (unit:%). The second threshold value $\beta$ is defined by $\beta=(L/N) \times 100$ (unit:%).

Within the range from the threshold value $\alpha$ to the threshold value $\beta$, the cycle time Te of the horizontal synchronous signal is calculated in accordance with the designated scaling ratio X. Letting X be the scaling ratio set by the user, the cycle time Te is given by $$Te=Td+(Td \times X/100)/L \quad (1)$$

When $X>\alpha$, the cycle time Te of the horizontal synchronous signal is calculated by $$Te=Tp \times 1.1 \times M \quad (2)$$

In this embodiment, the controller unit 30 automatically calculates and sets the parameters such as the threshold values $\alpha$ and $\beta$ and the extended horizontal synchronous cycle time Te by the above-described calculation method in accordance with the process capabilities of the scanner unit (image scanner) 10 and scanner image processing unit 1280.

The horizontal synchronous cycle time Te is calculated in consideration of the image processing time in the scanner image processing unit 1280 and image data transfer amount. Hence, the cycle time Te is shorter than the cycle time of the horizontal synchronous signal in scanning of the scanner unit 10 and is adapted for the amount of image data to be processed by the image processing unit.

(First Example of Image Data Transfer Timing of Embodiment)

FIG. 9 is a timing chart showing a double-sided scanned image data transfer timing in the first setting example of the cycle time of the rear side horizontal synchronous signal. In FIG. 9, the first half indicates front side image data transfer, and the second half indicates rear side image data transfer. The video clock 705 is switched between the front side and the rear side.

Front side image data is transferred from the scanner unit 10 to the controller unit 30 in real time as video data by the normal video clock 705 and the normal horizontal synchronous signal generated by the scanner unit 10.

On the other hand, rear side image data is temporarily stored and then transferred by a video clock switched to a high frequency. The rear side image data is transferred from the scanner unit 10 to the controller unit 30 by the pseudo horizontal synchronous signal which has been calculated by the controller unit 30 and sent to the scanner unit 10 in the first setting example.

The upper row of FIG. 9 indicates transfer by the default cycle time Td when the scaling ratio X is smaller than the threshold value $\beta$. The middle row of FIG. 9 indicates transfer by the cycle time Te (Te1 in FIG. 1B) which changes depending on the scaling ratio X in accordance with equation (1) when the scaling ratio X falls within the range from the threshold value $\beta$ (inclusive) to the threshold value $\alpha$ (inclusive). The lower row of FIG. 9 indicates transfer by the cycle time Te (Te2 in FIG. 1B) which does not change depending on the scaling ratio X in accordance with equation (2) when the scaling ratio X exceeds the threshold value $\alpha$.

(First Example of Process Procedure on Controller Unit Side)

Figure 10A:
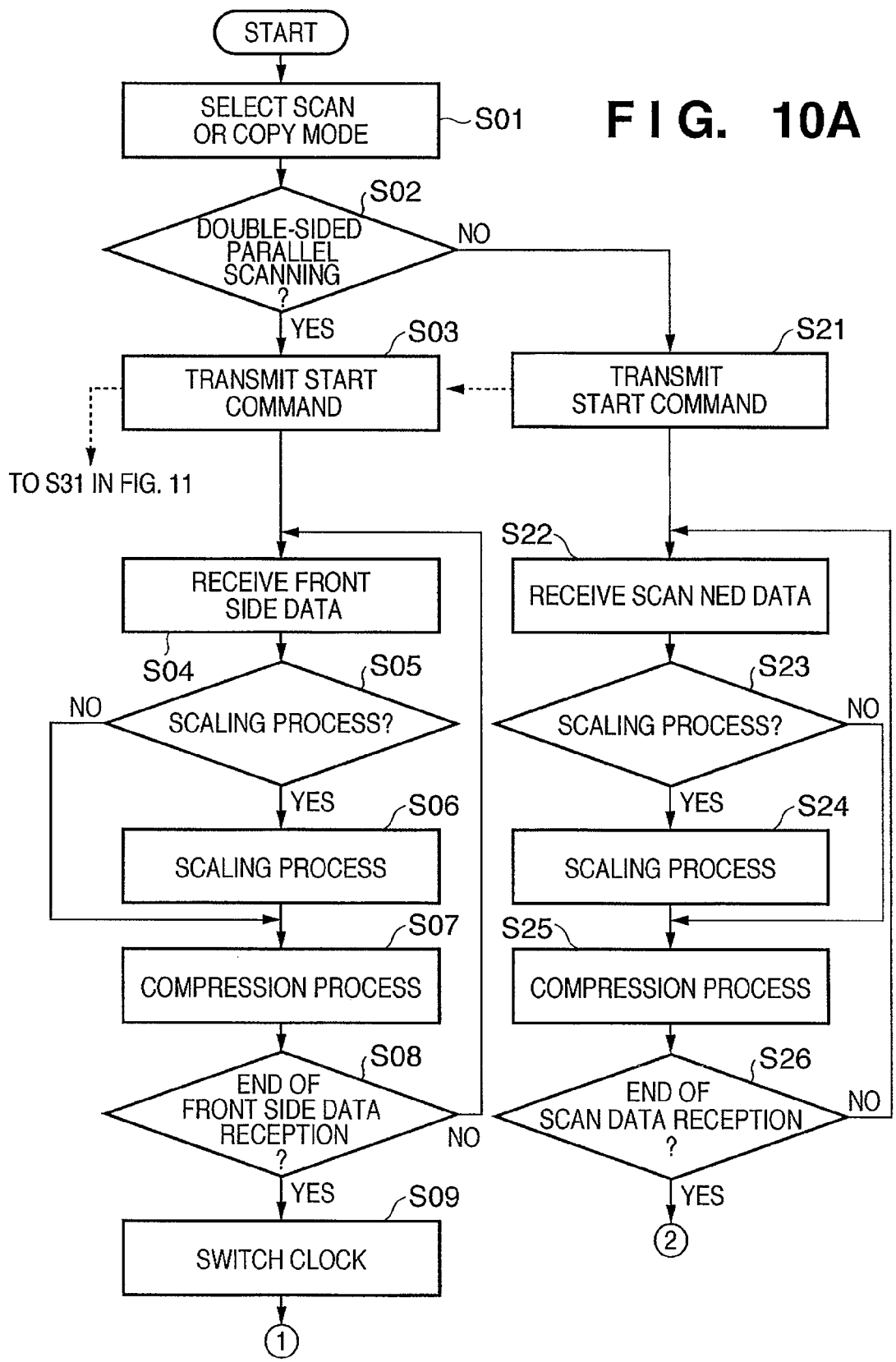
FIGS. 10A and 10B are a flowchart illustrating the process procedure on the controller unit side according to the first example of the embodiment.
Figure 10B:
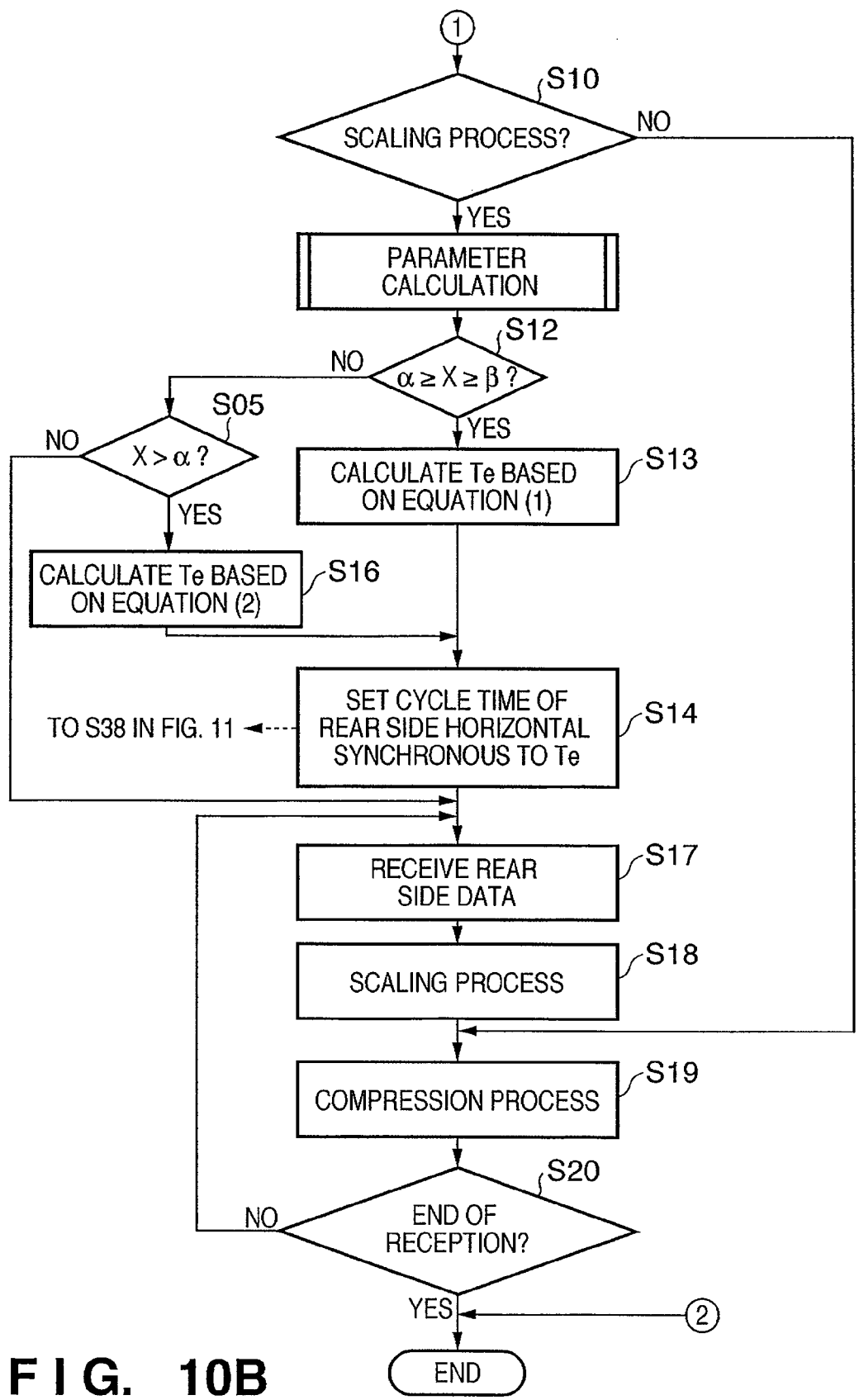

FIGS. 10A and 10B are a flowchart illustrating the process procedure on the side of the controller unit 30 according to the embodiment in the first setting example of the cycle time of the rear side horizontal synchronous signal.

S01 (select the scan or copy mode): The user selects the "scan mode" or "copy mode" on the user interface (to be referred to as the UI hereinafter) in FIG. 4.

S02 (select double-sided parallel scanning): If the double-sided parallel scan mode is selected on the UI, the process advances to step S03. Otherwise, the process advances to step S21.

S03 (transmit a start command): After scan settings by the controller unit, a double-sided scan start instruction is transmitted to the image scanner (to step S31 in FIG. 11).

S04 (receive front side data): Front side scanned image data is received from the image scanner in synchronous with the video clock and the vertical and horizontal synchronous signals.

S05 (determine the presence/absence of the scaling process): If the user selects scaling process settings, the process advances to step S06. Otherwise, the process advances to step S07.

S06 (scaling process): The received image data is sequentially scaling-processed at the scaling ratio set by the user and output to the compression process module.

S07 (compression process): The input image data is compressed and sequentially output to the module of the succeeding stage.

S08 (confirm end of front side data reception): When front side scanned image data reception is ended, the process advances to step S09. Otherwise, the process returns to step S04.

S09 (switch the clock): The video clock of the image scanner is switched to a rear side scanning frequency prepared in advance.

S10 (determine the presence/absence of the scaling process): If the user selects scaling process settings, the process advances to step S11. Otherwise, the process advances to step S19.

S11 (calculate the parameters): The parameters Tp, L, α, and β are calculated in accordance with the specifications of the units.

S12 (confirm whether the scaling ratio X satisfies $\alpha \geq X \geq \beta$): If the scaling ratio X set by the user falls within the range from the threshold value β (inclusive) to the threshold value α (inclusive), the process advances to step S13. Otherwise, the process advances to step S15.

S13 (calculate Te based on equation (1)): Te is calculated by Td+(Td×X/100)/L.

S14 (set the cycle time of the rear side horizontal synchronous signal to Te): The cycle time of the rear side horizontal synchronous signal of the image scanner is set to the cycle time Te calculated in step S13 as a cycle time extended for the scaling process (to step S38 in FIG. 11).

S15 (confirm whether the scaling ratio X satisfies X>α): If the scaling ratio X set by the user is larger than the threshold value α, the process advances to step S16. Otherwise, the process advances to step S17.

S16 (calculate Te based on equation (2)): Te is calculated by Tp×1.1×M.

S17 (receive rear side data): Rear side scanned image data is received in synchronous with the video clock, the vertical synchronous signal and the set horizontal synchronous signal.

S18 (scaling process): The received image data is sequentially scaling-processed at the scaling ratio set by the user and output to the compression process module.

S19 (compression process): The input image data is compressed and sequentially output to the module of the succeeding stage.

S20 (confirm end of rear side data reception): When rear side scanned data reception is ended, the process is ended. Otherwise, the process returns to step S17.

S21 (transmit a start command): After scan settings by the controller unit, a single-sided scan start instruction is transmitted to the image scanner (to step S31 in FIG. 11).

S22 (receive scan data): Scanned image data is received from the image scanner in synchronous with the video clock and the normal vertical and horizontal synchronous signals.

S23 (determine the presence/absence of the scaling process): If the user selects scaling process settings, the process advances to step S24. Otherwise, the process advances to step S25.

S24 (scaling process): The received image data is sequentially scaling-processed at the scaling ratio set by the user and output to the compression process module.

S25 (compression process): The input image data is compressed and sequentially output to the module of the succeeding stage.

S26 (confirm end of scan data reception): When scanned data reception is ended, the process is ended. Otherwise, the process returns to step S22.

(Example of Process Procedure on Image Scanner (Scanner Unit) Side)

Figure 11:
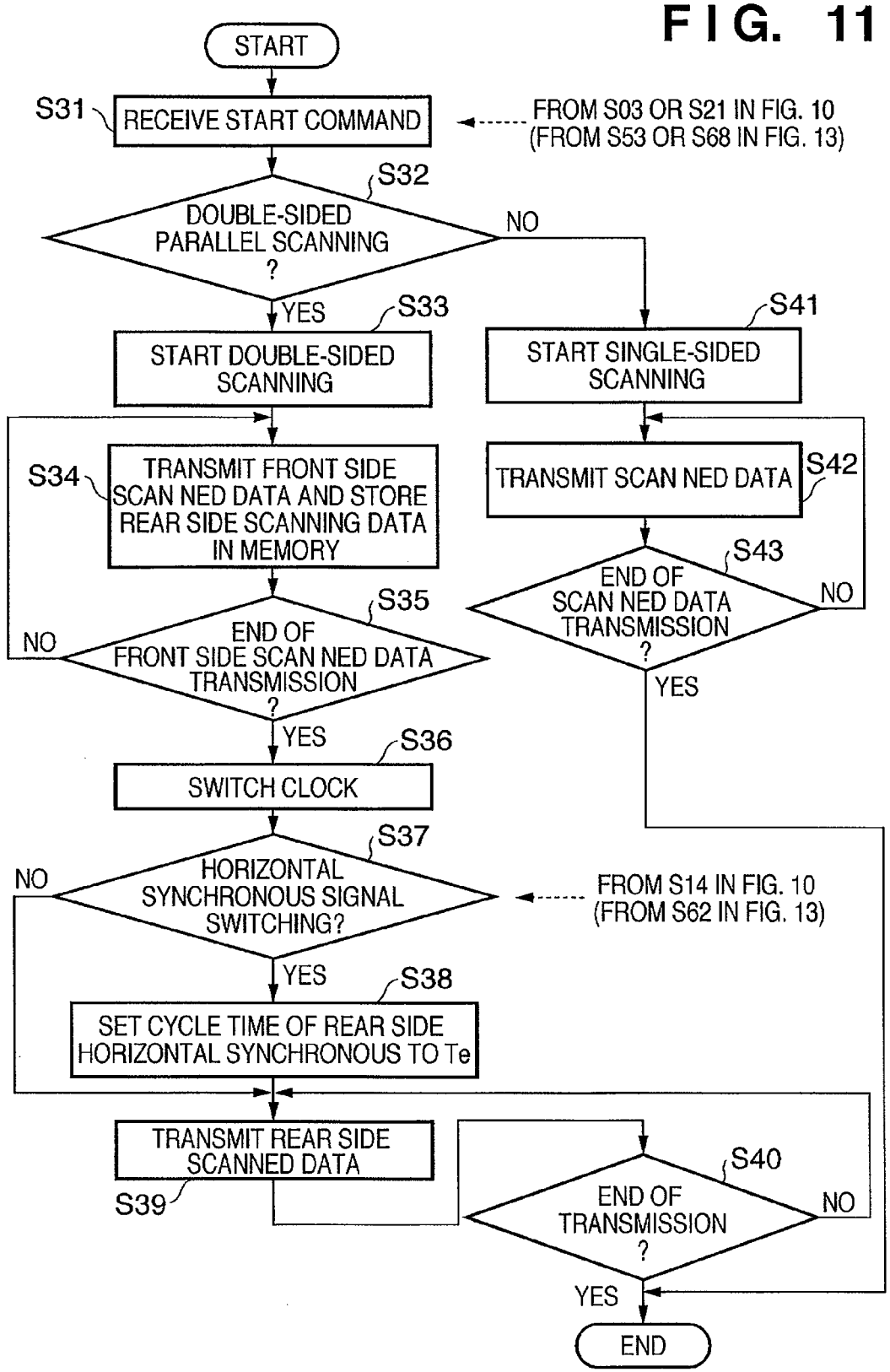
FIG. 11 is a flowchart illustrating the process procedure on the image scanner unit side according to the embodiment.

FIG. 11 is a flowchart illustrating an example of the process procedure on the image scanner side according to the embodiment in the first setting example of the cycle time of the rear side horizontal synchronous signal.

S31 (receive the start command): A scan start command is received from the controller unit (from step S03 or S21 in FIG. 10, or from step S53 or S68 in FIG. 13).

S32 (confirm double-sided parallel scan setting): If double-sided parallel scanning is set, the process advances to step S33. Otherwise, the process advances to step S41.

S33 (start double-sided parallel scanning): Scanning of a double-sided document is started by using the front side scan sensor and the rear side scan sensor in parallel.

S34 (transmit front side scanned data and store rear side scanned data in the memory): The front side scanned data is sequentially transmitted to the controller unit in real time in synchronous with the video clock and the normal horizontal and vertical synchronous signals. At the same time, the rear side scanned data is sequentially stored in the internal memory of the image scanner.

S35 (confirm end of front side scanned data transmission): When front side scanned image data transmission is ended, the process advances to step S36. Otherwise, the process returns to step S34.

S36 (switch the clock): The video clock is switched to the rear side scanning video clock in accordance with a command from the controller unit.

S37 (confirm whether switching cycle time of horizontal synchronous signal occurs): If a horizontal synchronous signal cycle time switching command is received from the controller unit, the process advances to step S38. Otherwise, the process advances to step S39 (from step S14 in FIG. 10, or from step S62 in FIG. 13).

S38 (set the cycle time of the horizontal synchronous signal to Te): The cycle time of the horizontal synchronous signal is set to Te sent from the controller unit.

S39 (transmit rear side scanned data): The rear side scanned data is sequentially read out from the memory and transmitted to the controller unit in synchronous with the video clock, the vertical synchronous signal and the set horizontal synchronous signal.

S40 (start single-sided scanning): Single-sided scanning starts.

S41 (transmit single-sided scanned data): The single-sided scanned data is sequentially transmitted to the controller unit in real time in synchronous with the video clock and the normal horizontal and vertical synchronous signals.

S42 (confirm end of single-sided scanned data transmission): When scanned data transmission is ended, the process is ended. Otherwise, the process returns to step S42.

(Second Example of Image Data Transfer Timing of Embodiment)

In the image processing apparatus of the second embodiment, the image scanner scans the front and rear sides of a double-sided document in parallel. In transferring the scanned image data of the front and rear sides to the image processing unit sequentially, the cycle time of the horizontal synchronous signal is extended only for the rear side when the scaling ratio required by the user exceeds a preset threshold value.

(Second Setting Example of Cycle Time of Rear Side Horizontal Synchronous Signal)

Let $\alpha$ be the threshold value preset for the scaling ratio, Td be the default value of the cycle time of the rear side horizontal synchronous signal, and Te be the cycle time extended for the scaling process. The image processing unit has a line memory. An input image is processed for each band including N lines. One band is divided into a plurality of packets so that the process is performed for each packet. One band includes M packets (FIG. 8).

Let A be the number of clocks necessary for scaling and compression by the image processing unit, and B be the operation frequency of the image processing unit. The process time Tp of one packet is given by $Tp=1/B \times A$.

Hence, the number L of transmission lines to be transmitted by the default value Td of the horizontal synchronous signal, which is necessary for ensuring a time to enable scaling and compression of one band (N lines), is given by $L=(Tp \times 1.1 \times M)/Td$. The threshold value $\alpha$ is calculated by $\alpha=(2N/L) \times 100(\%)$.

When the scaling ratio X satisfies $X>\alpha$, the cycle time Te of the horizontal synchronous signal is calculated by $Te=Tp \times 1.1 \times M$.

(Second Example of Image Data Transfer Timing of Embodiment)

Figure 12:
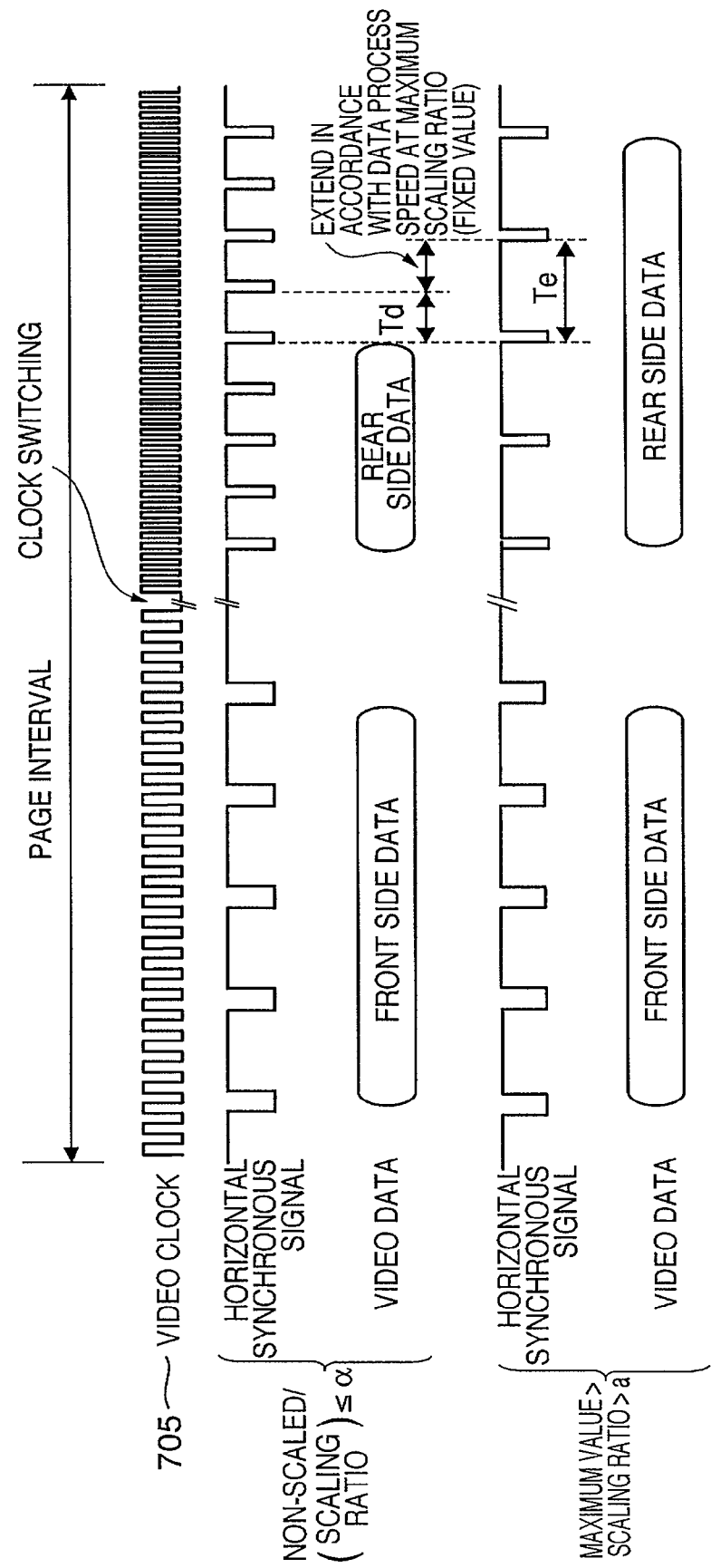
FIG. 12 is a timing chart showing the concept of image data transfer according to the second example of the embodiment.

FIG. 12 is a timing chart showing a double-sided scanned image data transfer timing in the second setting example of the cycle time of the rear side horizontal synchronous signal. In FIG. 12, the first half indicates front side image data transfer, and the second half indicates rear side image data transfer. The video clock 705 is switched between the front side and the rear side.

Front side image data is transferred from the scanner unit 10 to the controller unit 30 in real time as video data by the normal video clock 705 and the normal horizontal synchronous signal generated by the scanner unit.

On the other hand, rear side image data is temporarily stored and then transferred by a video clock switched to a high frequency. The rear side image data is transferred from the scanner unit 10 to the controller unit 30 by the pseudo horizontal synchronous signal which ha been calculated by the controller unit 30 and sent to the scanner unit 10 in the second example.

The upper row of FIG. 12 indicates transfer by the default cycle time Td when the scaling ratio X is equal to or smaller than the threshold value $\alpha$. The lower row of FIG. 12 indicates transfer by the cycle time Te (Te2 in FIG. 1B) which does not change depending on the calculated scaling ratio X when the scaling ratio X exceeds the threshold value $\alpha$.

(Second Example of Process Procedure on Controller Unit Side)

Figure 13B:
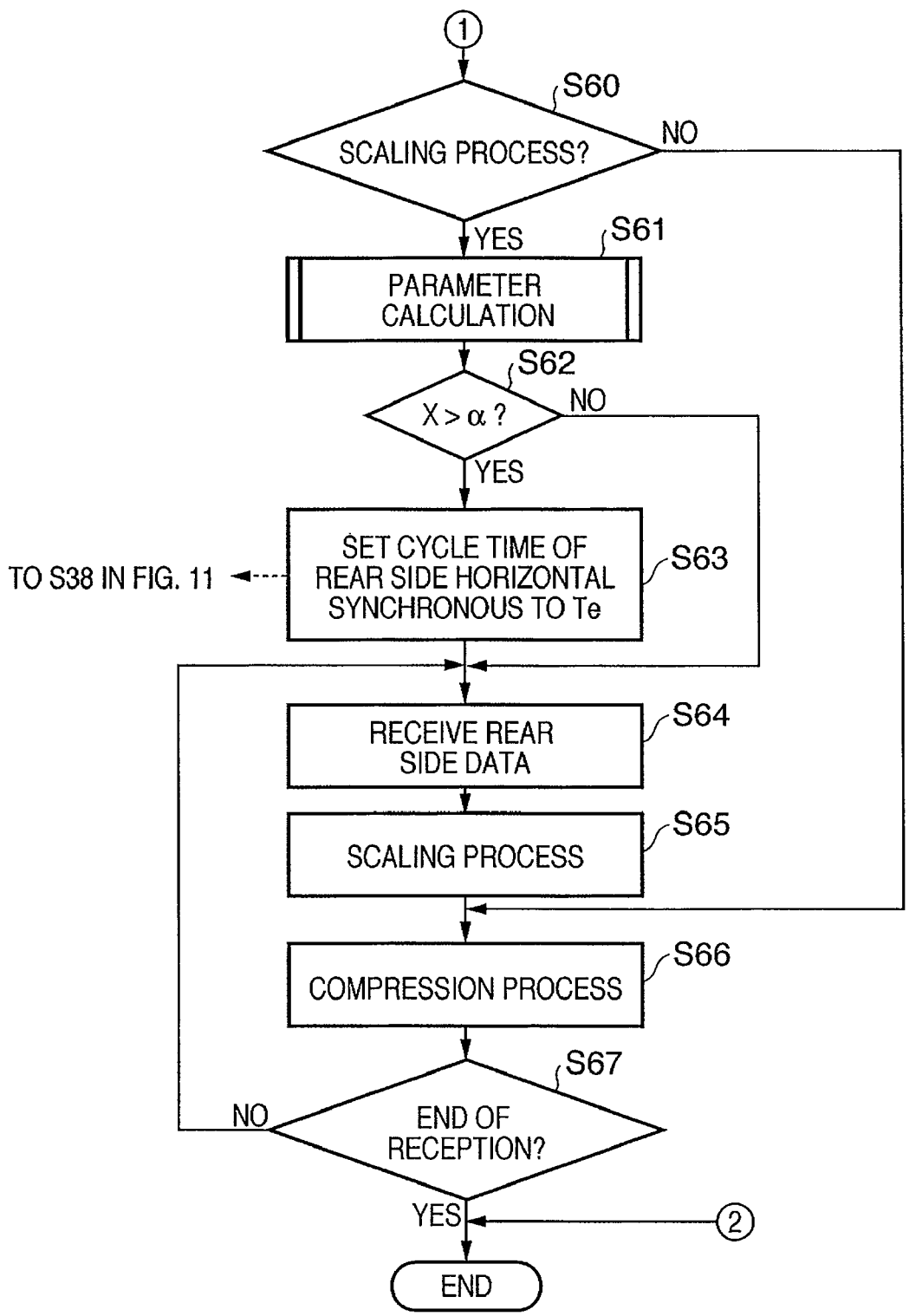

FIGS. 13A and 13B are a flowchart illustrating the process procedure on the side of the controller unit 30 according to the embodiment in the second setting example of the cycle time of the rear side horizontal synchronous signal.

S51 (select the scan or copy mode): The user selects the "scan mode" or "copy mode" on the user interface (to be referred to as the UI hereinafter) in FIG. 4.

S52 (select double-sided parallel scanning): If the double-sided parallel scan mode is selected on the UI, the process advances to step S53. Otherwise, the process advances to step S67.

S53 (transmit a start command): After scan settings by the controller unit, a double-sided scan start instruction is transmitted to the image scanner (to step S31 in FIG. 11).

S54 (receive front side data): Front side scanned image data is received from the image scanner in synchronous with the video clock and the normal vertical and horizontal synchronous signals.

S55 (determine the presence/absence of the scaling process): If the user selects scaling process settings, the process advances to step S56. Otherwise, the process advances to step S57.

S56 (scaling process): The received image data is sequentially scaling-processed at the scaling ratio set by the user and output to the compression process module.

S57 (compression process): The input image data is compressed and sequentially output to the module of the succeeding stage.

S58 (confirm end of front side data reception): When front side scanned data reception is ended, the process advances to step S59. Otherwise, the process returns to step S54.

S59 (switch the clock): The video clock of the image scanner is switched to a rear side scanning frequency prepared in advance.

S60 (determine the presence/absence of the scaling process): If the user selects scaling process settings, the process advances to step S61. Otherwise, the process advances to step S65.

S61 (calculate the parameters): The parameters Tp, L, and $\alpha$ are calculated in accordance with the specifications of the units.

S62 (confirm the scaling ratio X): If the scaling ratio X set by the user is larger than the threshold value $\alpha$, the process advances to step S63. Otherwise, the process advances to step S64.

S63 (set the cycle time of the rear side horizontal synchronous signal to Te): The cycle time of the rear side horizontal synchronous signal of the image scanner is set to the preset cycle time Te extended for the scaling process (to step S38 in FIG. 11).

S64 (receive rear side data): Rear side scanned image data is received in synchronous with the video clock, the vertical synchronous signal and the set horizontal synchronous signal.

S65 (scaling process): The received image data in sequentially scaling-processed at the scaling ratio set by the user and output to the compression process module.

S66 (compression process): The input image data is compressed and sequentially output to the module of the succeeding stage.

S67 (confirm end of rear side data reception): When rear side scanned data reception is ended, the process is ended. Otherwise, the process returns to step S64.

S68 (transmit a start command): After scan settings by the controller unit, a single-sided scan start instruction is transmitted to the image scanner (to step S31 in FIG. 11).

S69 (receive scan data): Scanned image data is received from the image scanner in synchronous with the video clock and the normal vertical and horizontal synchronous signals.

S70 (determine the presence/absence of the scaling process): If the user selects scaling process settings, the process advances to step S71. Otherwise, the process advances to step S72.

S71 (scaling process): The received image data is sequentially scaling-processed at the scaling ratio set by the user and output to the compression process module.

S72 (compression process): The input image data is compressed and sequentially output to the module of the succeeding stage.

S73 (confirm end of scan data reception): When scan data reception is ended, the process is ended. Otherwise, the process returns to step S69.

The process procedure on the side of the scanner unit (image scanner) 10 in the second setting example of the cycle time of the rear side horizontal synchronous signal is the same as in the first example, and a description thereof will not be repeated (FIG. 11).

<Another Embodiment>

In image processing of this embodiment, an image scanner scans on the front and rear sides of a double-sided document in parallel. In transferring the scan image data of the front and rear sides to a scanner image processing unit sequentially, the cycle time of the horizontal synchronous signal is set to an optimum value only for the rear side in accordance with the process speeds of all image processes (including image processes A to F (1283)) executed by the scanner image processing unit.

Figure 14:
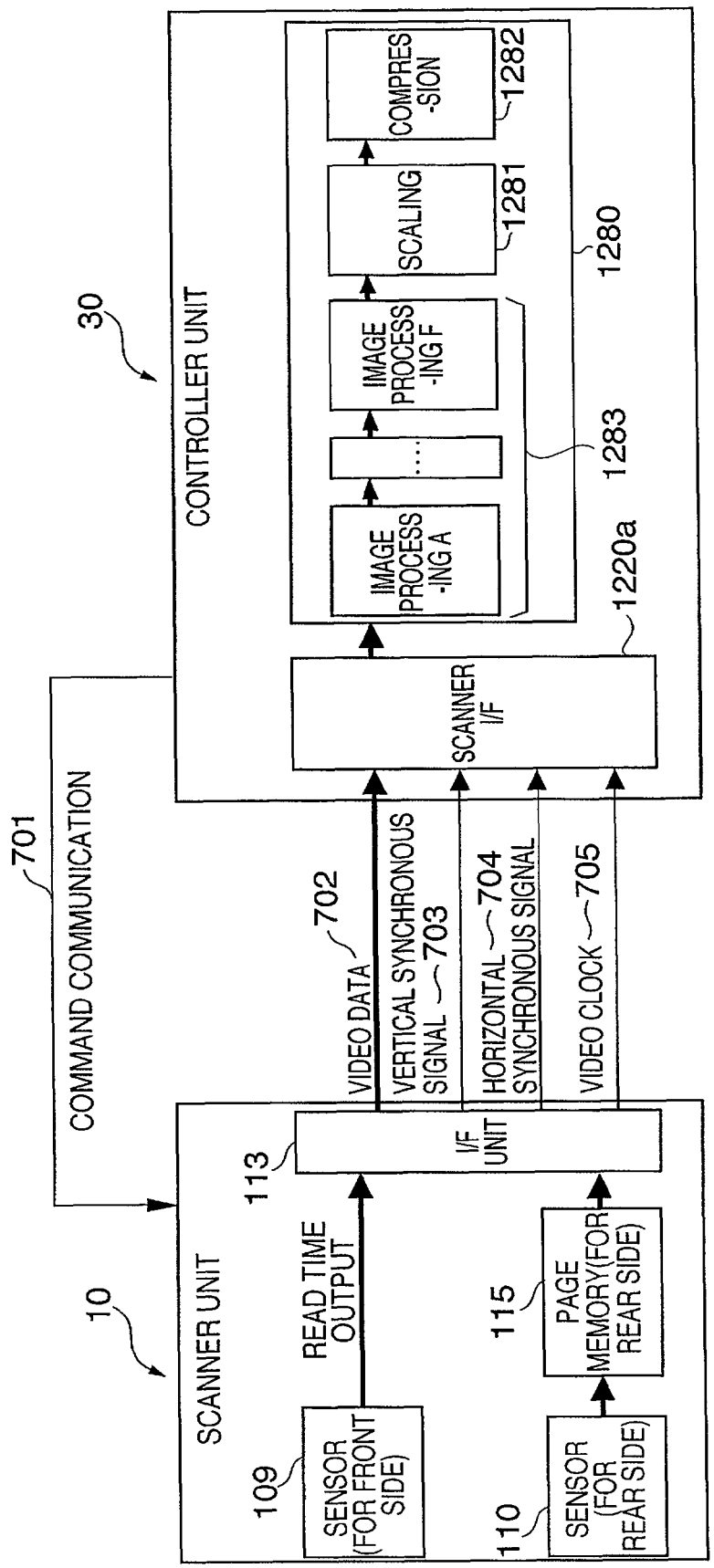
FIG. 14 is a block diagram showing an arrangement related to image data transfer between an image scanner unit and a controller unit according to another embodiment.

FIG. 14 shows a system configuration based on the concept of the operations of a scanner unit 10 and a controller unit 30 according to this embodiment.

The parameter calculation method is almost the same as in the first and second examples. The only different point is the method of calculating the process speed per unit-time of a scanning image processing unit 1280. The method is different only in that the process time of image processing (image processes A to F (1283)) to be passed is added to Tp.

The process flowchart and timing chart of this embodiment will therefore be omitted.

The present invention is applicable to a system of an integrated apparatus including a plurality of devices (for example, host computer, interface device, and printer).

The object of the present invention is also achieved by the following method. A storage medium (or recording medium) which records software program codes to implement the functions of the above-described embodiments is supplied to a system or apparatus. The computer (or CPU or MPU) of the system or apparatus reads out and executes the program codes stored in the storage medium.

In this case, the program codes read out from the storage medium themselves implement the functions of the above-described embodiments. The storage medium that stores the program codes constitutes the present invention.

The functions of the above-described embodiments are implemented not only by causing the computer to execute the readout program codes. The present invention also incorporates the following arrangement. The operating system (OS) running on the computer partially or wholly executes actual processing on the basis of the instructions of the program codes, thereby implementing the functions of the above-described embodiments.

Alternatively the program codes read out from the storage medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The storage medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-022241, filed on Jan. 31, 2007, which is hereby incorporated by reference herein in its entirety.

What is claimed is:

1. An image processing apparatus comprising:
a plurality of scanning units configured to scan on both sides of a document, the plurality of scanning units including a first scanning unit and a second scanning unit;
an image processing unit configured to execute image processing based on image data obtained by scanning of any one of the plurality of scanning units;
a transfer unit configured to transfer first image data obtained by the first scanning unit scanning on a first side of the document to the image processing unit in accordance with a synchronous signal, and after completion of transfer of the first image data, transfer second image data obtained by the second scanning unit scanning on a second side of the document to the image processing unit in accordance with the synchronous signal, wherein the second image data is temporarily stored in a storage unit before transfer of the second image data; and
a setting unit configured to set processing contents of the image processing to be executed by the image processing unit,
wherein the transfer unit transfers the second image data on which the image processing is not executed by the image processing unit, from the storage unit in which the second image data has been temporarily stored, to the image processing unit in accordance with the synchronous signal whose cycle time is changed in accordance with the processing contents set by the setting unit.

2. The apparatus according to claim 1, wherein when transferring the first image data, the transfer unit uses, as the cycle time of the synchronous signal, a predetermined cycle time independently of the processing contents set by the setting unit.

3. The apparatus according to claim 1, wherein the image processing unit can execute a scaling process of the image data, and the setting unit sets a scaling ratio as the processing contents of the image processing to be executed by the image processing unit.

4. The apparatus according to claim 3, wherein when transferring the second image data, the transfer unit uses, as the cycle time of the synchronous signal, a cycle time changed in accordance with a process time of the image processing in the image processing unit and a transfer amount of the second image data.

5. The apparatus according to claim 4, wherein the process time of the image processing in the image processing unit includes a process time required for the scaling process of the image data and a process time required for a compression process of the image data.

6. The apparatus according to claim 5, wherein the process time of the image processing in the image processing unit also includes a process time required for a process except the scaling process and compression process of the image data.

7. The apparatus according to claim 4, wherein the transfer amount of the second image data corresponds to a number of lines as a unit of image data transfer and a number of packets to transfer the number of lines.

8. An image processing method in an image processing apparatus including a plurality of scanning units configured to scan on both sides of a document, the plurality of scanning units including a first scanning unit and a second scanning unit, and an image processing unit configured to execute image processing based on image data obtained by scanning of any one of the plurality of scanning units, the method comprising the steps of:
   setting processing contents of the image processing to be executed by the image processing unit;
   executing first transfer of first image data obtained by the first scanning unit scanning on a first side of the document to the image processing unit in accordance with a synchronous signal;
   temporarily storing second image data in a storage unit obtained by the second scanning unit scanning on a second side of the document; and
   executing, after completion of transfer of the first image data, second transfer of the second image data on which the image processing is not executed by the image processing unit, from the storage unit to the image processing unit in accordance with the synchronous signal,
   wherein in the second transfer, a cycle time of the synchronous signal is changed in accordance with the processing contents set in the setting step.

9. The method according to claim 8, wherein in the first transfer, a predetermined cycle time independently of the processing contents set in the setting step is used as a cycle time of the synchronous signal.

10. The method according to claim 8, wherein the image processing unit can execute a scaling process of the image data, and in the setting step, a scaling ratio is set as the processing contents of the image processing to be executed by the image processing unit.

11. A non-transitory computer-readable storage medium which stores a program for causing a computer of an image processing apparatus, including a plurality of scanning units configured to scan on both sides of a document, the plurality of scanning units including a first scanning unit and a second scanning unit, an image processing unit configured to execute image processing based on image data obtained by scanning of any one of the plurality of scanning units, and a transfer unit configured to transfer first image data obtained by the first scanning unit scanning on a first side of the document to the image processing unit in accordance with a synchronous signal, and after completion of transfer of the first image data, transfer second image data obtained by the second scanning unit scanning on a second side of the document to the image processing unit in accordance with the synchronous signal, to execute steps of:
   setting processing contents of the image processing to be executed by the image processing unit; and
   changing, when transferring the second image data on which the image processing is not executed by the image processing unit, from a storage unit in which the second image data has been temporarily stored, to the image processing unit, a cycle time of the synchronous signal in accordance with the processing contents set in the setting step.

12. An image scanning apparatus for transferring image data to an image processing unit configured to execute image processing based on the image data, comprising:
   a plurality of scanning units configured to scan on both sides of a document, the plurality of scanning units including a first scanning unit and a second scanning unit;
   a transfer unit configured to transfer first image data obtained by the first scanning unit scanning on a first side of the document to the image processing unit in accordance with a synchronous signal, and after completion of transfer of the first image data, transfer second image data obtained by the second scanning unit scanning on a second side of the document to the image processing unit in accordance with the synchronous signal, wherein the second image data is temporarily stored in a storage unit before transfer of the second image data,
   wherein the transfer unit transfers the second image data on which the image processing is not executed by the image processing unit, from the storage unit in which the second image data has been temporarily stored, to the image processing unit in accordance with the synchronous signal, whose cycle time is changed in accordance with processing contents of the image processing to be executed by the image processing unit.

* * * * *